United States Patent
Hama et al.

(10) Patent No.: US 9,736,324 B2
(45) Date of Patent: Aug. 15, 2017

(54) SHEET POST-PROCESSING DEVICE AND IMAGE FORMATION SYSTEM

(71) Applicant: Konica Minolta, Inc., Chiyoda-ku (JP)

(72) Inventors: Riichi Hama, Toyokawa (JP); Ryo Morita, Toyohashi (JP); Akiyoshi Johdai, Toyokawa (JP); Shinobu Seki, Toyohashi (JP); Naoya Nakayama, Toyokawa (JP); Masaki Matsui, Toyokawa (JP); Hidehito Kishi, Toyokawa (JP); Shigeki Nozawa, Gifu (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/464,906

(22) Filed: Aug. 21, 2014

(65) Prior Publication Data

US 2015/0055200 A1    Feb. 26, 2015

(30) Foreign Application Priority Data

Aug. 22, 2013  (JP) .................................. 2013-172490
Aug. 13, 2014  (JP) .................................. 2014-164865
Aug. 13, 2014  (JP) .................................. 2014-164866

(51) Int. Cl.
    H04N 1/04      (2006.01)
    H04N 1/00      (2006.01)
    H04N 1/12      (2006.01)

(52) U.S. Cl.
    CPC ........... *H04N 1/00527* (2013.01); *H04N 1/00* (2013.01); *H04N 1/12* (2013.01)

(58) Field of Classification Search
    CPC ................................................. H04N 1/00527
    (Continued)

(56) References Cited

U.S. PATENT DOCUMENTS 5,997,239 A   12/1999  Mimura et al.
7,758,034 B1   7/2010  Namba et al.
(Continued)

FOREIGN PATENT DOCUMENTS

CN    1349138 A     5/2002
JP    11-043256 A   2/1999
(Continued)

OTHER PUBLICATIONS

First Office Action dated Feb. 22, 2016, by the State Intellectual Property Office of the People's Republic of China in the corresponding Chinese Patent Application No. 2014104181754 and English translation (18 pages).
(Continued)

*Primary Examiner* — Houshang Safaipour
(74) *Attorney, Agent, or Firm* — Buchanan Ingersoll & Rooney PC

(57) ABSTRACT

A sheet post-processing device is mounted in an image forming apparatus that includes an image reading unit and an image forming unit. The image forming unit is located under the image reading unit with a space therebetween. The sheet post-processing device includes: a first tray that is located in the space and houses a sheet ejected from the image forming unit; a post-processing unit that is located in the space and performs post-processing on a sheet in the first tray; a transfer member that, after the post-processing is performed on a sheet in the first tray, transfers the sheet to a front side of the image forming apparatus; and a second tray that is located closer to the front side of the image forming apparatus than the first tray and houses a sheet transferred by the transfer member.

11 Claims, 18 Drawing Sheets

(58) Field of Classification Search
USPC ................................ 358/498, 497, 496, 474
See application file for complete search history.

(56) References Cited

U.S. PATENT DOCUMENTS

| | | |
|---|---|---|
| 2002/0044810 A1 | 4/2002 | Sato et al. |
| 2002/0109283 A1 | 8/2002 | Hasegawa et al. |
| 2006/0202402 A1* | 9/2006 | Nagata ..................... B42C 1/12 270/58.08 |
| 2012/0313309 A1 | 12/2012 | Yoshida |

FOREIGN PATENT DOCUMENTS

| | | |
|---|---|---|
| JP | 11-49420 A | 2/1999 |
| JP | H11-043257 A | 2/1999 |
| JP | 2002-128364 A | 5/2002 |
| JP | 2002-241036 A | 8/2002 |
| JP | 2004-123332 A | 4/2004 |
| JP | 2006-251648 A | 9/2006 |
| JP | 2007-031142 A | 2/2007 |
| JP | 2009-167011 A | 7/2009 |
| JP | 2012-254849 A | 12/2012 |

OTHER PUBLICATIONS

Office Action dated Aug. 24, 2016, by the State Intellectual Property Office of the People's Republic of China in corresponding Chinese Patent Application No. 201410418175.4, and an English Translation of the Office Action. (16 pages).

Office Action (Notification of Reasons for Refusal) dated Sep. 13, 2016, by the Japanese Patent Office in corresponding Japanese Patent Application No. 2014-164866, and an English Translation of the Office Action. (pages).

Third Office Action in corresponding Chinese Patent Application No. 201410418175.4, dated Mar. 28, 2017, with English Translation (19 pages).

* cited by examiner

SHEET POST-PROCESSING DEVICE AND IMAGE FORMATION SYSTEM

This application is based on applications No. 2013-172490, No. 2014-164865 and No. 2014-164866 filed in Japan, the contents of which are hereby incorporated by reference.

BACKGROUND OF THE INVENTION (1) Field of the Invention

The present invention relates to a sheet post-processing device mounted in an image forming apparatus, and also to an image formation system including the image forming apparatus and the sheet post-processing device.

(2) Related Art

Among image forming apparatuses such as copiers, there is a so-called in-body ejection type. In this type of image forming apparatus, an image forming unit is provided under an image reading unit with a space therebetween. After an image is formed on a recording sheet or the like by the image forming unit, the recording sheet is housed into an ejection tray provided in the space. With the in-body ejection type, the ejection tray does not protrude from a side surface of the image forming apparatus, and the space occupied by the image forming apparatus can be reduced.

Japanese Patent Application Publication No. 2002-128364 discloses an in-body ejection type image forming apparatus in which a sheet post-processing device is mounted. The sheet post-processing device is provided in a space (in-body space) between an image reading unit and an image forming unit, and performs post-processing, such as stapling, on a sheet ejected from the image forming unit.

The sheet post-processing device includes a processing tray and a stack tray. The processing tray temporarily houses a stack of sheets after images are formed thereon, so that post-processing is performed on the stack of sheets. The stack tray houses the stack of sheets transferred from the processing tray after the post-processing. When seen from the front side of the image forming apparatus, the processing tray and the stack tray are aligned side by side in the left-right direction, where the stack tray is closer to the right side of the image forming apparatus than the processing tray.

The aforementioned publication includes a plan view in which the stack of sheets housed in the stack tray is easily seen, and discloses that the user can easily take the stack of sheets after post-processing.

However, if the processing tray and the stack tray are aligned side by side in the left-right direction within the in-body space as disclosed in the above publication, the size of the sheet post-processing device in the left-right direction becomes large. As a result, the in-body space of the image forming apparatus also needs to be increased in the left-right direction according to the size of the sheet post-processing device.

SUMMARY OF THE INVENTION

The present invention aims to provide a sheet post-processing device whose size in the left-right direction is reduced, and an image formation system including an image forming apparatus and the sheet post-processing device.

The above aim is achieved by a sheet post-processing device mounted in an image forming apparatus that includes an image reading unit and an image forming unit, the image forming unit being located under the image reading unit with a space therebetween, the image forming apparatus having an opening that is located at a front side thereof and in communication with the space, the sheet post-processing device comprising: a first tray that is located in the space and houses a sheet ejected from the image forming unit; a post-processing unit that is located in the space and performs post-processing on a sheet in the first tray; a transfer member that, after the post-processing is performed on a sheet in the first tray, transfers the sheet to the front side of the image forming apparatus; and a second tray that is located closer to the front side of the image forming apparatus than the first tray and houses a sheet transferred by the transfer member.

The above aim is also achieved by an image forming system including a sheet post-processing device and an image forming apparatus, the image forming apparatus comprising an image reading unit and an image forming unit, the image forming unit being located under the image reading unit with a space therebetween, the image forming apparatus having an opening that is located at a front side thereof and in communication with the space, the sheet post-processing device comprising: a first tray that is located in the space and houses a sheet ejected from the image forming unit; a post-processing unit that is located in the space and performs post-processing on a sheet in the first tray; a transfer member that, after the post-processing is performed on a sheet in the first tray, transfers the sheet to the front side of the image forming apparatus; and a second tray that is located closer to the front side of the image forming apparatus than the first tray and houses a sheet transferred by the transfer member, the image forming apparatus further comprising: an operation unit that is provided at the front side of the image forming apparatus and receives an input through a user operation, wherein the operation unit is aligned with the second tray of the sheet post-processing device in a left-right direction of the image forming apparatus.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the Drawings.

DESCRIPTION OF PREFERRED EMBODIMENTS

The following describes an embodiment of a sheet post-processing device and an image formation system according to the present invention, with reference to the drawings.

Figure 1:
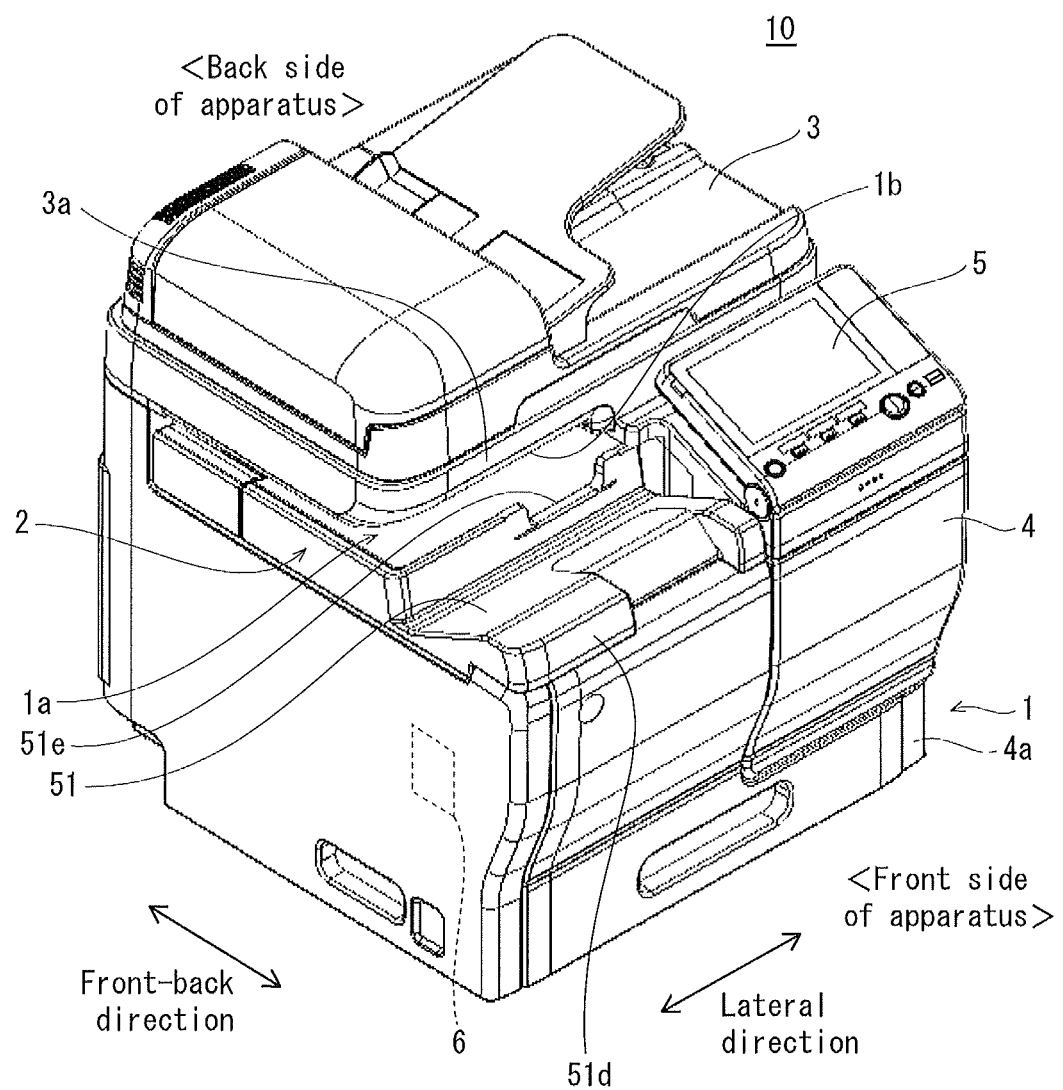
FIG. 1 shows an overall structure of an image formation system including an image forming apparatus and a sheet post-processing device.

FIG. 1 is a frontal view showing an overall structure of an image formation system.

As shown in FIG. 1, an image formation system 10 includes an image forming apparatus 1 and a sheet post-processing device 2 mounted in the image forming apparatus 1.

<Structure of Image Forming Apparatus 1>

The image forming apparatus 1 is of an in-body ejection type, and includes a scanning unit 3, a printing unit 4, an operation unit 5, and a control unit 6. The printing unit 4 is located under the scanning unit 3 with a space 1a therebetween. The image forming apparatus 1 has an opening 1b that is located at the front side thereof and in communication with the space 1a. The image forming apparatus 1 has a function of executing various jobs, such as: a scanning job for reading an image on a document; a copy job for printing a document image onto a sheet based on image data obtained from the reading in the scanning job; and a print job for receiving a job request from an external terminal (not shown) connected to a network, and printing an image pertaining to the received job onto a sheet.

The scanning unit (image reading unit) 3 transports a document that has been set, reads an image on the document, and obtains image data.

The printing unit (image forming unit) 4, using an electrophotographic method, forms (prints) an image on a sheet based on either image data obtained by the scanning unit 3 or print job data from the external terminal.

Figure 3:
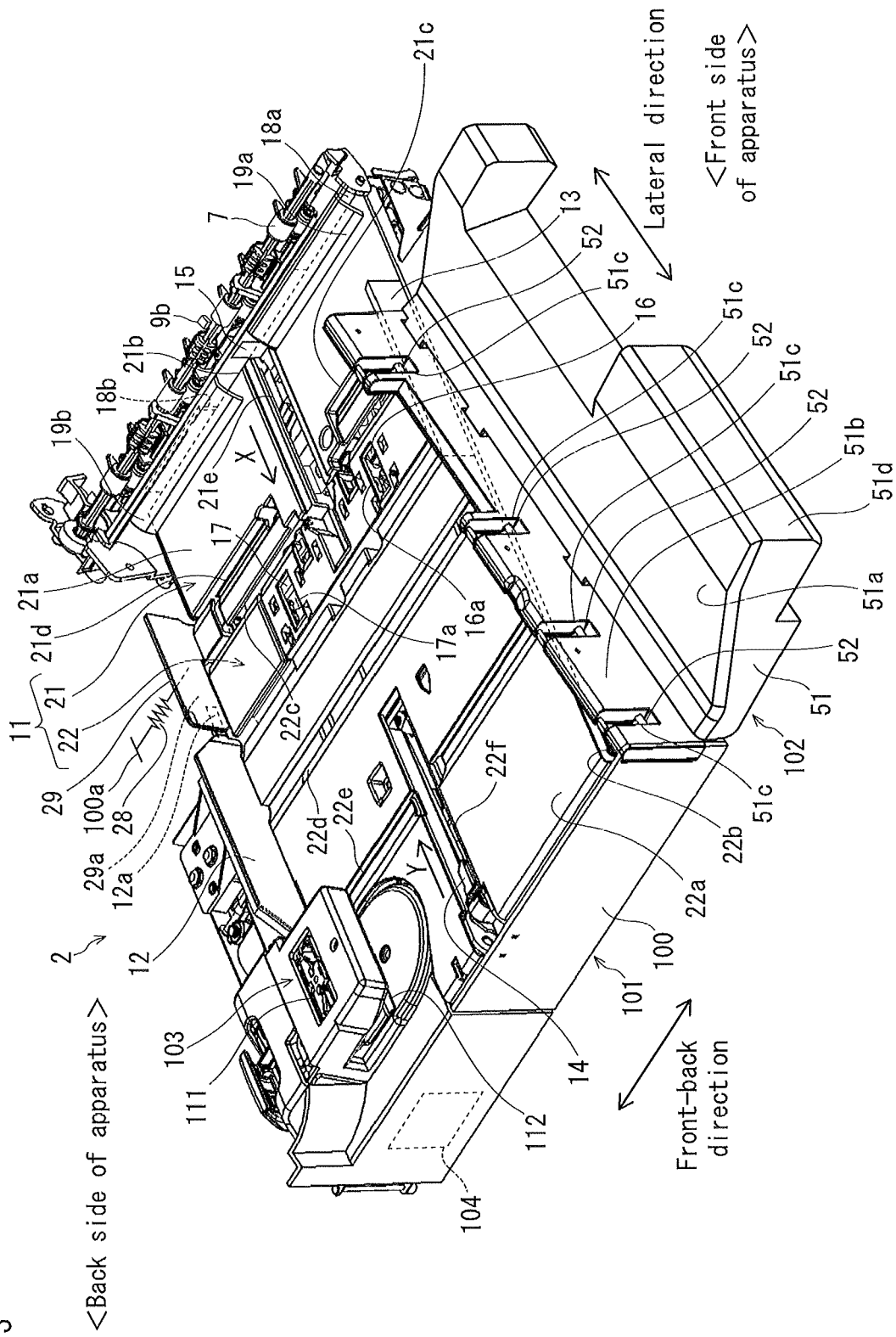
FIG. 3 is a schematic overall perspective view when the sheet post-processing device is seen from above and a front side of the image forming apparatus.

During image formation, the printing unit 4 feeds sheets from a cassette 4a provided at the lowermost position one by one, forms an image every time a sheet is fed, and ejects the sheets on which images are formed, one by one, with an ejection roller 7 (FIG. 3). Each ejected sheet is transported into the sheet post-processing device 2 provided in the space 1a. Note that instead of the electrophotographic method, the printing unit 4 may employ an ink-jet method, for example.

The operation unit 5 is arranged at a position easily accessible for a user when the user stands in front of the image forming apparatus 1. The operation unit 5 receives an input operation from a user, and transmits the input operation to the control unit 6. Examples of the input operation include: input of the number of sheets to be printed; an instruction on the start of a job such as a copy job; an instruction on stopping a job; and an instruction on post-processing performed by the sheet post-processing device 2, such as a stapling execution instruction or a specification of the number of copies for the stapling.

The control unit 6 receives input information from the user via the operation unit 5, and causes the scanning unit 3 and the printing unit 4 to smoothly perform operations on the job corresponding to the user's instruction. Upon receiving an instruction on the execution of post-processing, the control unit 6 transmits the instruction to the sheet post-processing device 2 so as to cause the sheet post-processing device 2 to perform the post-processing.

Hereinafter, regarding the image forming apparatus 1, a front side of the apparatus refers to the side at which the operation unit 5 is arranged; a back side, right side, and left side of the apparatus respectively refer to a rear side of (behind) the apparatus, a right side of the apparatus, and a left side of the apparatus when the image forming apparatus 1 is seen from the front side; a front-back direction of the apparatus refers to a direction along the line connecting the front side and back side of the apparatus; and a lateral direction of the apparatus refers to a left-right direction perpendicular to the front-back direction of the apparatus.

<Structure of Sheet Post-Processing Device 2>

Figure 2:
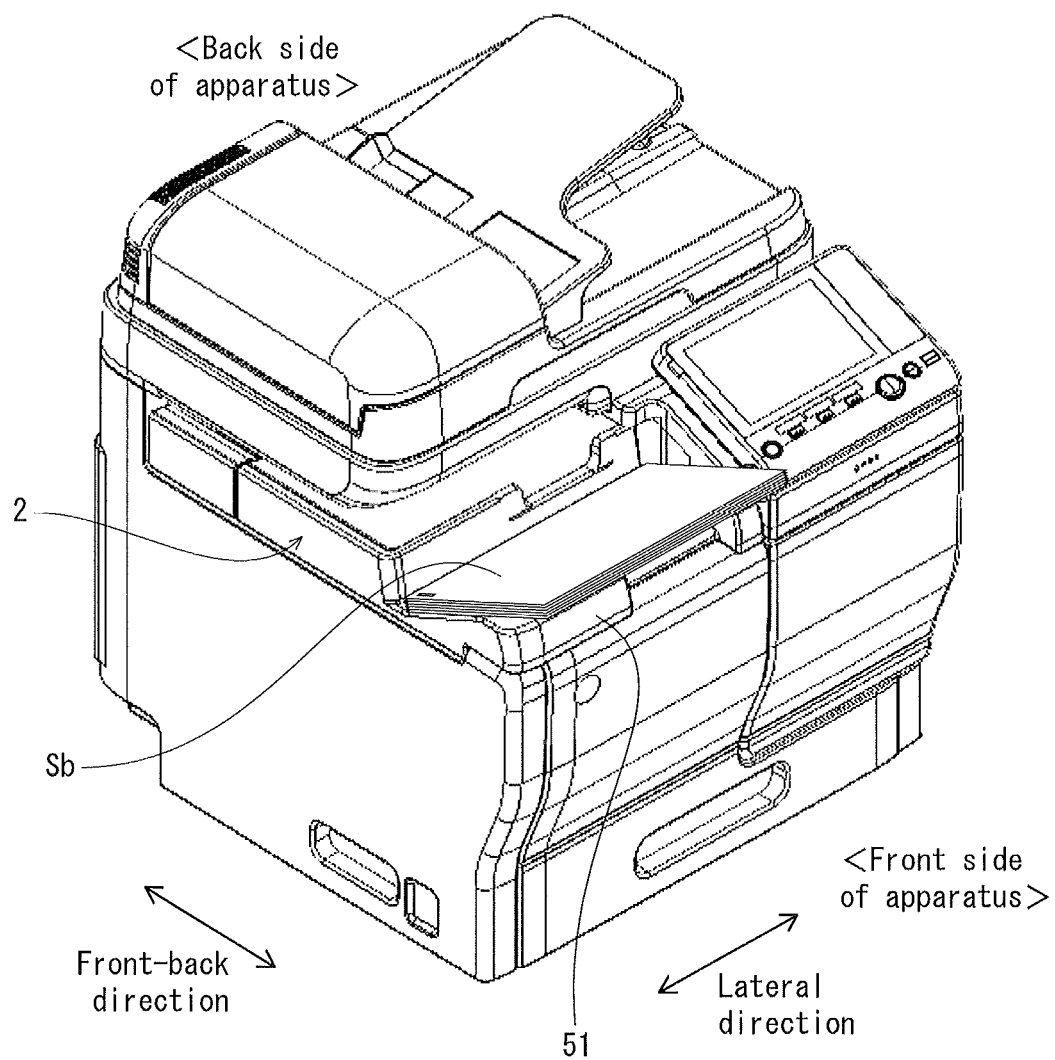
FIG. 2 is a perspective view showing a stack of sheets housed in a front tray of the sheet post-processing device.

The sheet post-processing device 2 is arranged in the space 1a of the image forming apparatus 1, which is in communication with the opening 1b at the front side of the apparatus. The sheet post-processing device 2 has a stapling function of stapling a stack of sheets composed of a plurality of sheets ejected from the printing unit 4. As shown in FIG. 2, the sheet post-processing device 2 houses, in a front tray 51, a stack of sheets Sb that has been stapled. The following specifically describes the structure of the sheet post-processing device 2 with use of FIGS. 3 to 11.

FIG. 3 is a schematic overall perspective view when the sheet post-processing device 2 is seen from above and the front side of the apparatus. FIG. 3 also shows the ejection roller 7 of the printing unit 4.

As shown in FIG. 3, the sheet post-processing device 2 includes a first housing 101, a second housing 102, a stapler 103, and a controller 104.

<Structure of First Housing 101>

The first housing 101 temporarily houses a sheet ejected from the ejection roller 7 of the printing unit 4. The first housing 101 includes a post-processing tray 11, a CD reference plate 12, a CD alignment plate 13, an FD alignment member 14, an FD transport member 15, and guide claws 16 and 17.

The post-processing tray 11 (first tray) includes a fixed tray 21 and a swing tray 22. The fixed tray 21 and the swing tray 22 are arranged in this order along the transport direction (i.e., direction indicated by arrow X) of the sheets ejected by the ejection roller 7 of the printing unit 4. Hereinafter, on the post-processing tray 11, the direction indicated by arrow X is referred to as a sheet transport direction.

The fixed tray 21 is fixedly supported by a device body 100 of the sheet post-processing device 2.

The swing tray 22 is supported by the device body 100 in a manner that an end 22c of the swing tray 22 located upstream in the sheet transport direction is swingable up and down about a shaft 22b provided at an end of the swing tray 22 located downstream in the sheet transport direction.

Note that FIG. 3 shows an inclined state where the end 22c of the swing tray 22 is at the lowermost position. When the sheets on the swing tray 22 are to be transferred to the front side of the apparatus as described below, the end 22c of the swing tray 22 is raised so that the swing tray 22 transitions to a horizontal state (see FIG. 9). The swing tray 22 swings when, as a tray moving unit, a cam mechanism (not shown) located lower than the swing tray 22 is driven by the drive force of a lift motor M5 (see FIG. 12). Note that the tray moving unit is not limited to the cam mechanism as long as the tray moving unit can move up and down.

The upper surfaces of the fixed tray 21 and the swing tray 22 serve as sheet placement surfaces 21a and 22a, respectively.

At an end 21b of the sheet placement surface 21a located upstream in the sheet transport direction, two plate-like stoppers, i.e., stoppers 18a and 18b, are arranged upright with a space therebetween along the front-back direction of the apparatus.

The stoppers 18a and 18b are used as regulation members for aligning the sheets on the post-processing tray 11 in the sheet transport direction. Alignment of sheets in the sheet transport direction is referred to as FD alignment.

Holding guides 19a and 19b are arranged immediately above the stoppers 18a and 18b with a predetermined space from the stoppers 18a and 18b. The holding guides 19a and 19b change the orientation of a sheet, which is ejected by the ejection roller 7 of the printing unit 4, such that the sheet is oriented downward, and leads the sheet to the fixed tray 21.

After passing through the holding guides 19a and 19b and being led to the fixed tray 21, the sheet is placed on the sheet placement surface 21a of the fixed tray 21. If the length of the sheet in the sheet transport direction is longer than the fixed tray 21, the sheet is placed over both the sheet placement surface 21a of the fixed tray 21 and the sheet placement surface 22a of the swing tray 22. The holding guides 19a and 19b of the first housing 101 serve as the entrances for the sheet ejected from the printing unit 4. The ejection roller 7 serves as an ejector of the printing unit 4.

The CD reference plate 12 is used as a positioning member for determining a reference position at the time when the sheets on the post-processing tray 11 are aligned in the front-back direction of the apparatus. The CD reference plate 12 is arranged in a state perpendicular to the sheet placement surface 22a of the swing tray 22 and parallel to the sheet transport direction. The CD reference plate 12 is movable in the front-back direction of the apparatus along two grooves 22d and 22e which extend in the front-back direction of the apparatus. The grooves 22d and 22e are arranged in the sheet placement surface 22a with a space therebetween in the sheet transport direction. Alignment of sheets in the front-back direction of the apparatus is referred to as CD alignment.

FIG. 3 shows a state where the CD reference plate 12 is at a home position which is closest to the back side of the apparatus. For CD alignment, the CD reference plate 12 moves toward the front side of the apparatus by a predetermined distance (e.g., 10 mm) and stops. This stop position is the reference position during CD alignment. The reference position also serves as a stapling reference position in the front-back direction of the apparatus at which the stapler 103 staples a stack of sheets.

Also, as described later, the CD reference plate 12 also serves as a transfer member for transferring the sheets on the post-processing tray 11 to the front tray 51 of the second housing 102 by moving to the position closest to the front side of the apparatus. The movement of the CD reference plate 12 is performed by the drive force of a transfer motor M4 (see FIG. 12). For example, the CD reference plate 12 may be connected to the rotational shaft of the transfer motor M4 via a rotational wire (not shown) suspended under tension over at least two pulleys (not shown). Then, the rotational wire may be rotated by the drive force of the transfer motor M4, and the drive force generated by the rotation may be transferred to the CD reference plate 12 to move the CD reference plate 12.

Note that the CD reference plate 12 is not necessarily driven by the wire. For example, the CD reference plate 12 may be directly moved by a feed screw mechanism. The same mechanism as that used for the CD reference plate 12 may be employed for the CD alignment plate 13, the FD alignment member 14, and the FD transport member 15.

The CD alignment plate 13 is a member for performing CD alignment on the sheets on the post-processing tray 11. The CD alignment plate 13 is arranged in a state perpendicular to the sheet placement surface 21a of the fixed tray 21 and parallel to the sheet transport direction. The CD alignment plate 13 is supported by the fixed tray 21 such that the CD alignment plate 13 is movable in the front-back direction of the apparatus along a groove 21c. The groove 21c is arranged in the sheet placement surface 21a and extends in the front-back direction of the apparatus. FIG. 3 shows a state where the CD alignment plate 13 is at a home position which is closest to the front side of the apparatus. The movement of the CD alignment plate 13 is performed by the drive force of a CD alignment motor M2 (see FIG. 12).

A CD reference plate 29 is arranged at the end of the fixed tray 21 at the back side of the apparatus. Specifically, the CD reference plate 29 is arranged at the position that faces the CD alignment plate 13 and that is more upstream than the CD reference plate 12 in the sheet transport direction.

The CD reference plate 29 has a CD alignment function, similarly to the CD reference plate 12. The CD reference plate 29 is arranged in a state perpendicular to the sheet placement surface 21a of the fixed tray 21 and parallel to the sheet transport direction. The CD reference plate 29 is movable in the front-back direction of the apparatus along a groove 21d. The groove 21d is arranged in the sheet placement surface 21a and extends in the front-back direction of the apparatus.

The CD reference plate 29 is connected to a portion 100a of the apparatus body via a tension spring 28. With the biasing force of the tension spring 28 toward the back side of the apparatus, a surface 29a of the CD reference plate 29 closer to the back side of the apparatus is always in contact with a protrusion 12a of the CD reference plat 12 at the end thereof located upstream in the sheet transport direction.

When the CD reference plate 12 moves toward the front side of the apparatus, the force applied toward the front side of the apparatus is transferred to the CD reference plate 29 via the protrusion 12a. As a result, the CD reference plate 29 moves toward the front side of the apparatus integrally with the CD reference plate 12, against the pull of the bias force of the tension spring 28.

On the other hand, when the CD reference plate 12 moves toward the back side of the apparatus, the CD reference plate 29 also moves toward the back side of the apparatus integrally with the CD reference plate 12 while the CD reference plate 29 remains in contact with the protrusion 12a of the CD reference plate 12 by the biasing force of the tension spring 28. Accordingly, it can be said that the CD reference plate 12 is a driving member and the CD reference plate 29 is a driven member.

Note that the CD reference plate 29 is restricted so as not to move beyond a home position toward the back side of the apparatus. When the swing tray 22 transitions to a horizontal state as described below, the CD reference plate 29 is disengaged from the CD reference plate 12. As a result, the CD reference plate 29 returns to the home position by the biasing force of the tension spring 28.

The FD alignment member 14 is used to perform FD alignment on the sheets on the post-processing tray 11. The FD alignment member 14 is movable along a groove 22f. The groove 22f is arranged in the sheet placement surface 22a of the swing tray 22 and extends in the sheet transport direction.

In a home position shown in FIG. 3, the FD alignment member 14 is in a housed state in which the FD alignment member 14 is housed inside the groove 22f of the swing tray 22. When the FD alignment member 14 moves from the home position in the reverse direction (i.e., direction indicated by arrow Y) relative to the sheet transport direction, and is located more upstream than the home position in the sheet transport direction, the top end of the FD alignment member 14 rises and protrudes from inside the groove 22f and is placed in a protruding state (see FIG. 4). The movement of the FD alignment member 14 is performed by the drive force of an FD alignment motor M3 (see FIG. 12).

The FD transport member 15 is a member for transporting the sheets placed on the post-processing tray 11 in the sheet transport direction. The FD transport member 15 is supported such that the top end thereof protrudes from a groove 21e, and is movable along the groove 21e. The groove 21e is arranged in the sheet placement surface 21a of the fixed tray 21 and extends in the sheet transport direction. FIG. 3 shows a state where the FD transport member 15 is located at a home position located at the most stream position in the sheet transport direction. The movement of the FD transport member 15 is performed by the drive force of a transport motor M1 (see FIG. 12).

The guide claws 16 and 17 are arranged inside holes 16a and 17a, respectively. The holes 16a and 17a are arranged in the sheet placement surface 22a of the swing tray 22, in the vicinity of the end 22c located upstream in the sheet transport direction. The holes 16a and 17a are arranged with a space therebetween in the front-back direction of the apparatus. The guide claws 16 and 17 are supported by the swing tray 22, and are switchable between a housed state where the guide claws 16 and 17 are housed inside the holes 16a and 17a and a protruding state (see FIG. 8) where the respective top ends of the guide claws 16 and 17 protrude from the holes 16a and 17a. The switching of the guide claws 16 and 17 between the housed state and the protruding state is performed, for example, by the drive force of a guide claw drive actuator 36 (see FIG. 12) that is a solenoid.

In the present example, when the guide claw drive actuator 36 is driven, the guide claws 16 and 17 are placed in the protruding state. When the driving of the guide claw drive actuator 36 stops, the guide claws 16 and 17 return to the housed state by the biasing force of a tension spring (not shown).

<Structure of Second Housing 102>

The second housing 102 includes the front tray 51 and four holding claws, i.e., holding claws 52.

The front tray 51 (i.e., second tray) is arranged closer to the front side of the apparatus than the post-processing tray 11 of the first housing 101. The front tray 51 houses the sheets transferred from the post-processing tray 11 toward the front side of the apparatus.

The front tray 51 has a sheet placement surface 51a and an upstanding wall 51b. The sheet placement surface 51a is inclined downward from the front side of the apparatus to the back side of the apparatus. The upstanding wall 51b vertically extends upward from the end of the sheet placement surface 51a closer to the back side of the apparatus.

With the sheet post-processing device 2 being mounted in the image forming apparatus 1, the front tray 51 is aligned with the operation unit 5 in the lateral direction of the apparatus (see FIG. 1) when the front tray 51 is seen from the front the side of the apparatus. Also, an edge 51d of the front tray 51 at the front side of the apparatus is located closer to the front side of the apparatus in the front-back direction of the apparatus than an edge 3a (see FIG. 1) of the scanning unit 3 at the front side of the apparatus.

Also, as shown in FIG. 3, the length of the front tray 51 in the lateral direction of the apparatus is substantially the same as the length of the swing tray 22 of the first housing 101 in the lateral direction of the apparatus.

The four holding claws 52 are respectively arranged in four cuts 51c. The cuts 51c are arranged in the upstanding wall 51b with spaces therebetween in the lateral direction of the apparatus. The holding claws 52 are supported such that the holding claws 52 are switchable between a housed state shown in FIG. 3 and a protruding state (see FIG. 11) in which the holding claws 52 protrude from the upstanding wall 51b as described below. When the holding claws 52 are placed in the protruding state, the holding claws 52 press down the sheets housed in the front tray 51 from above to prevent the sheets from floating.

<Structure of Stapler 103>

The stapler 103 is arranged at an end portion (corner), of the swing tray 22, that is at the back side of the apparatus and on the downstream side in the sheet transport direction. The stapler 103 is provided with a staple driver 111 and a staple receiver 112 which are arranged in the up-and-down direction with a space therebetween. Stapling is performed as follows. First, an end portion (corner) of a stack of sheets on the swing tray 22 is placed between the staple driver 111 and the staple receiver 112. Specifically, the corner of the stack of sheets is located closer to the back side of the apparatus and on the leading side of the stack of sheets in the sheet transport direction. With the corner of the stack of sheets being placed between the staple driver 111 and the staple receiver 112, the staple driver 111 moves downward to approach the staple receiver 112 and sandwiches the corner of the stack of sheets with the staple receiver 112. Then, with the bottom of the staple driver 111 pressing against the uppermost sheet in the stack of sheets, a staple is driven through the stack of sheets.

<Explanation about Operations for Stapling>

The following specifically describes operations performed when stapling is performed on N (plurality of) sheets S ejected from the image forming apparatus 1. The number of sheets S constituting a stack of sheets is N, which is the number of sheets to be stapled (staple sheet count).

When the first sheet is transported from the image forming apparatus 1 to the sheet post-processing device 2 via the ejection roller 7, the first sheet is led to the post-processing tray 11 via the holding guides 19a and 19b. The first sheet is transported on the post-processing tray 11 in the sheet transport direction by the drive force of the ejection roller 7 until the trailing edge of the first sheet in the sheet transport direction passes through the ejection roller 7.

When the trailing edge of the first sheet in the sheet transport direction passes through the ejection roller 7, the transport on the post-processing tray 11 is stopped, and the first sheet is placed on the post-processing tray 11.

Figure 4:
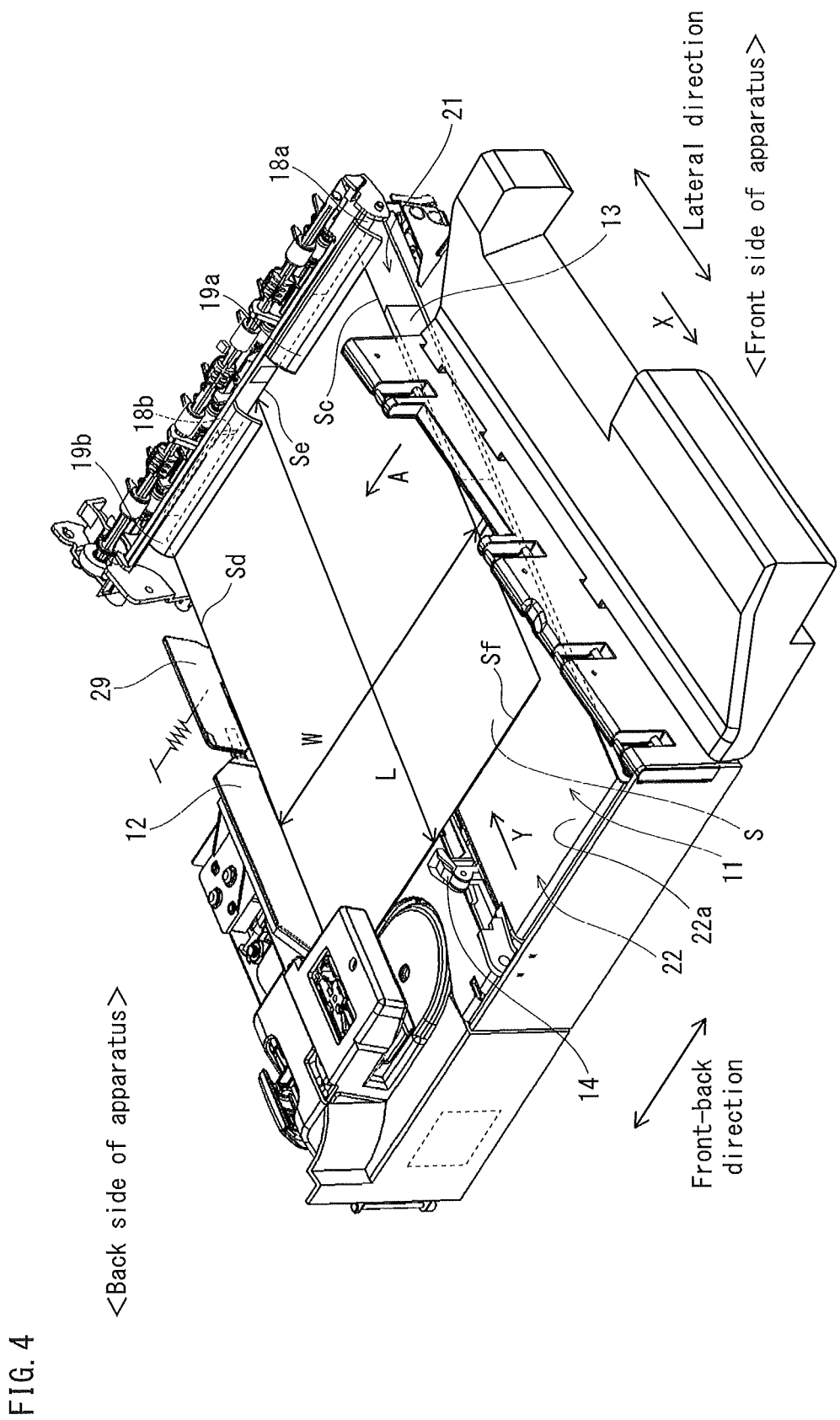
FIG. 4 is a schematic perspective view showing a state where the first sheet is placed on a post-processing tray.

FIG. 4 is a schematic perspective view showing a state where the first sheet S is placed on the post-processing tray 11.

In the example of FIG. 4, the sheet S is large in size. The length of the sheet S in the sheet transport direction is longer than the fixed tray 21, and the sheet S is therefore placed over both the fixed tray 21 and the swing tray 22.

Before the sheet S is placed on the post-processing tray 11, the CD reference plates 12 and 29 move from the respective home positions to the reference positions shown in FIG. 4. When the sheet S is placed on the post-processing tray 11, the FD alignment member 14 moves from the home position to an FD alignment position suitable for the size of the sheet S in the direction indicated by arrow Y, in order to perform FD alignment.

The FD alignment position is a position away from the stoppers 18*a* and 18*b* in the sheet transport direction by a sheet length L (sheet length) which is the length of the sheet S in the sheet transport direction. The FD alignment position is specified by obtaining, from the image forming apparatus 1, sheet information indicating the size of the sheet S (e.g., A4) and a transport orientation (portrait or landscape).

Here, the portrait transport orientation of the sheet S is the orientation when the sheet S is transported with a long side thereof being along the sheet transport direction. The landscape transport orientation of the sheet S is the orientation when the sheet S is transported with a short side thereof being along the sheet transport direction.

When the FD alignment member 14 moves to the FD alignment position, the sheet S on the post-processing tray 11 is pushed by the FD alignment member 14 in the direction indicated by arrow Y. As a result, the leading edge Sf of the sheet S in the transport direction makes contact with the FD alignment member 14, and the trailing edge Se of the sheet S in the transport direction makes contact with the stoppers 18*a* and 18*b*. In this way, the sheet S on the post-processing tray 11 is aligned in the sheet transport direction based on the positions of the stoppers 18*a* and 18*b* (FD alignment).

When the FD alignment is completed, the CD alignment plate 13 moves from the home position to the CD alignment position according to the size of the sheet S in the direction indicated by arrow A (i.e., direction toward the back side of the apparatus), in order to perform CD alignment.

The CD alignment position is the position away from the CD reference plate 12 by the length of the sheet S in the width direction (sheet width) W in the front-back direction of the apparatus. The CD alignment position is specified by obtaining sheet information from the image forming apparatus 1.

When the CD alignment plate 13 moves to the CD alignment position, the sheet S on the post-processing tray 11 is pushed by the CD alignment plate 13 in the direction indicated by arrow A. As a result, a side edge Sc, which is one of the side edges of the sheet S in the width direction, makes contact with the CD alignment plate 13, and a side edge Sd, which is the other side edge of the sheet S in the width direction, makes contact with the CD reference plates 12 and 29. In this way, the sheet S on the post-processing tray 11 is aligned in the front-back direction of the apparatus based on the positions of the CD reference plates 12 and 29 (CD alignment).

The FD alignment member 14 moves to the FD alignment position, and stops at the FD alignment position for a predetermined time period (e.g., 100 ms). When the FD alignment for the first sheet S is completed, the FD alignment member 14 returns to the position away from the FD alignment position by a predetermined distance (e.g., 10 mm or 15 mm), and waits for the next FD alignment. Similarly, the CD alignment plate 13 moves to the CD alignment position, and stops at the CD alignment position for a predetermined time period (e.g., 100 ms). When the CD alignment is completed, the CD alignment plate 13 returns to the position away from the CD alignment position by a predetermined distance (e.g., 10 mm or 15 mm), and waits for the second sheet S to be transported from the image forming apparatus 1 to the post-processing tray 11. Note that the CD alignment may be omitted for the first sheet S.

When the second sheet S is transported onto the post-processing tray 11, the aforementioned FD alignment and CD alignment are performed again with the second sheet S being placed on the first sheet S that has been aligned. FD alignment and CD alignment are performed on a per-sheet S basis until transport of all N sheets S is completed. With the above processing, a plurality of sheets S are aligned and loaded on the post-processing tray 11 one after another.

Figure 5:
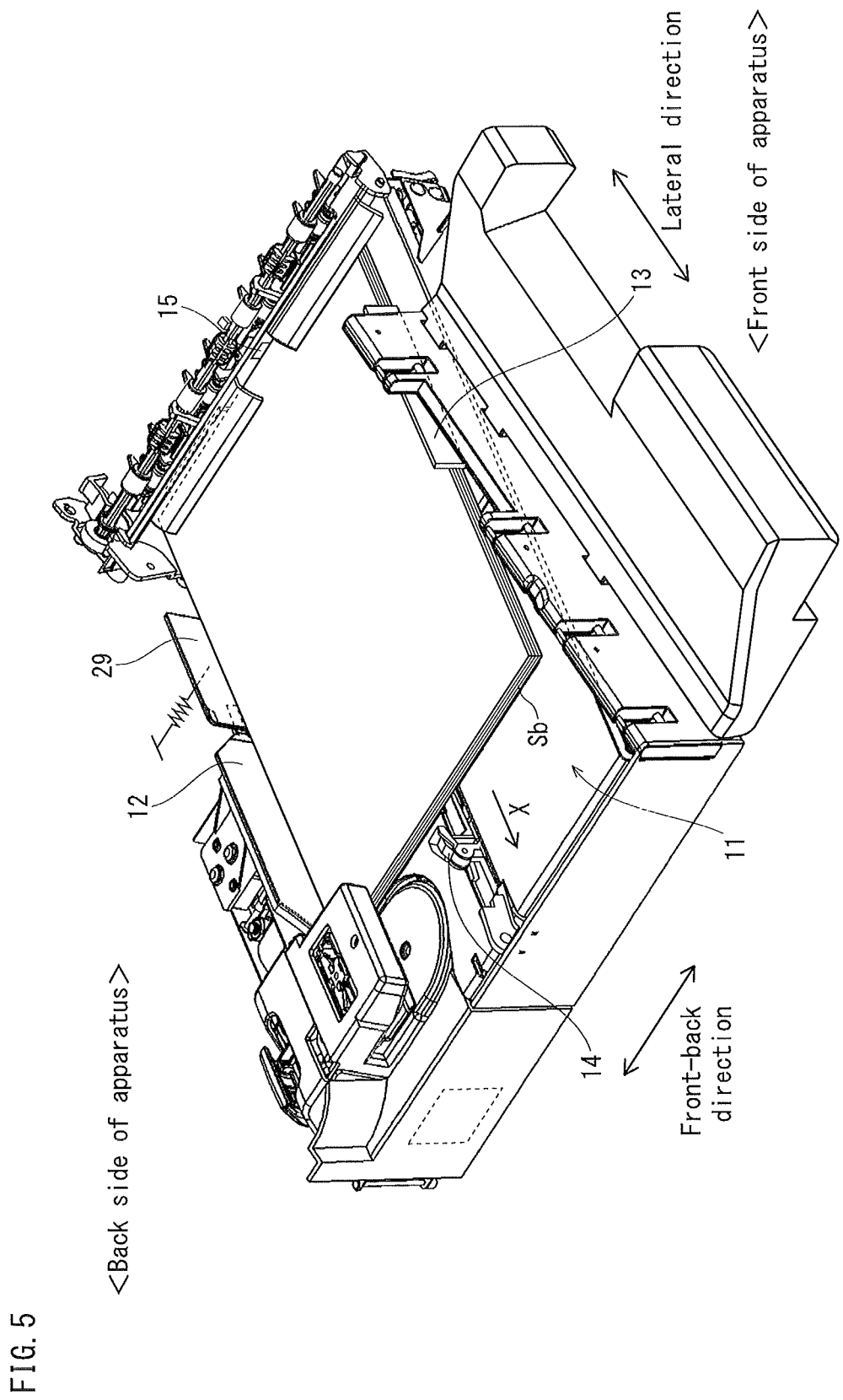
FIG. 5 is a schematic perspective view showing a state where a stack of sheets is aligned on the post-processing tray.

FIG. 5 is a schematic perspective view showing a state where a stack of sheets Sb, which is composed of N sheets S, is aligned on the post-processing tray 11. After all N sheets S have been aligned, the FD alignment member 14 returns to the home position by moving in the direction indicated by arrow X (sheet transport direction). The CD reference plates 12 and 29 move to the position away from the end of the stack of sheets Sb by 2 mm.

Then, the FD transport member 15 moves in the direction indicated by arrow X from the home position, and thereby transports the stack of sheets Sb, which is sandwiched between the CD reference plates 12 and 29 and the CD alignment plate 13, in the direction indicated by arrow X to the stapling position of the stapler 103. When the stack of sheets Sb is at the stapling position, the FD transport member 15 stops moving. The travel distance of the FD transport member 15 required for the stack of sheets Sb to be transported to the stapling position is determined with reference to stapling position information. The stapling position information indicates sheet sizes and travel distances in association with each other.

Figure 6:
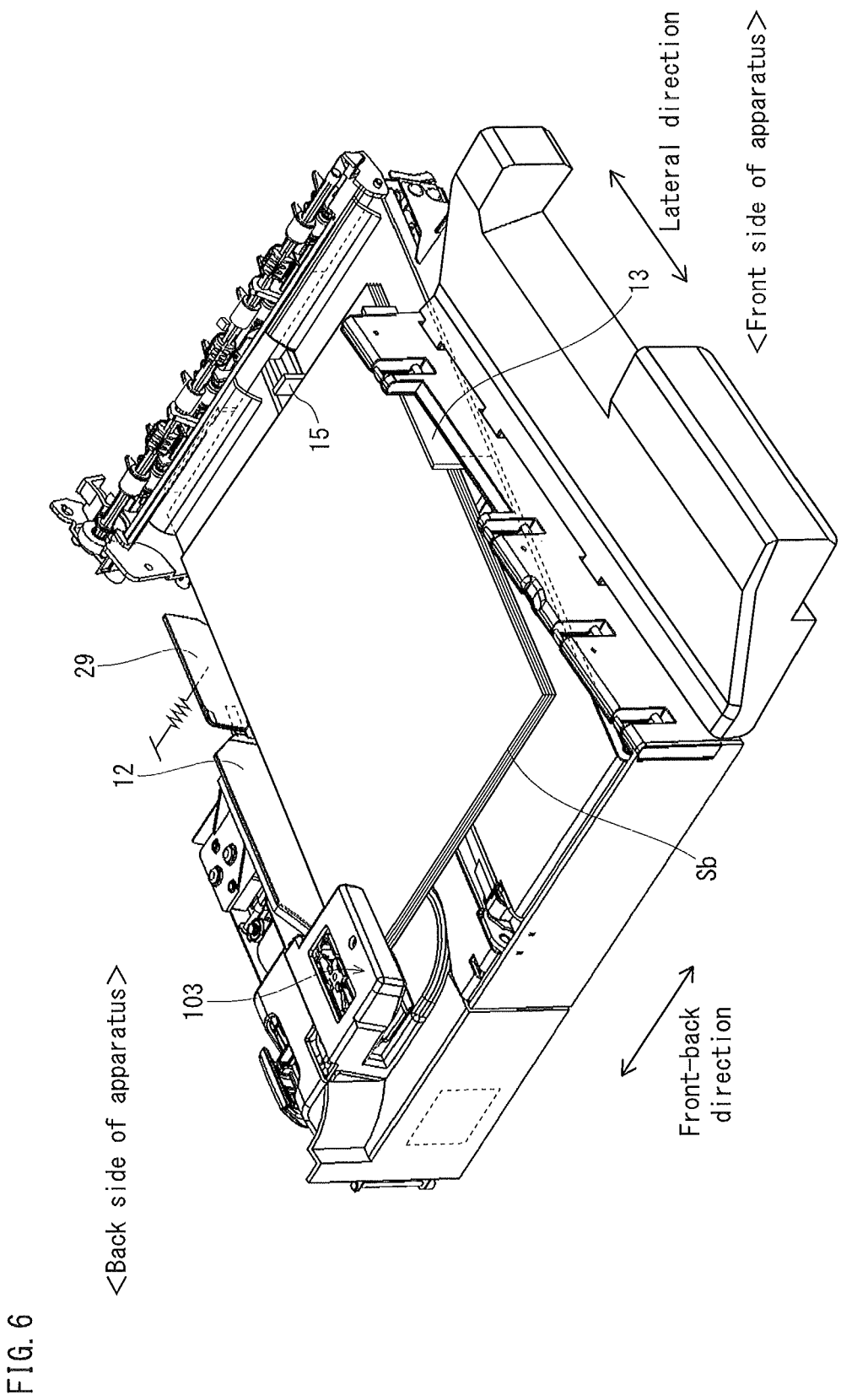
FIG. 6 is a schematic perspective view showing a state where a stack of sheets is transported by an FD transport member to a stapling position, and the transport of the stack of sheets is stopped at the stapling position.

FIG. 6 is a schematic perspective view showing a state where the stack of sheets Sb is transported by the FD transport member 15 to the stapling position, and the transport of the stack of sheets Sb is stopped at the stapling position. With the stack of sheets Sb being in the stop state, the stapler 103 performs stapling using a staple Sz (see FIG. 7).

After stapling, the FD transport member 15 further moves in the direction indicated by arrow X, and transports the stack of sheets Sb, which is sandwiched between the CD reference plates 12 and 29 and the CD alignment plate 13. The transport is performed until the trailing edge Se of the stack of sheets Sb in the transport direction reaches the position (transfer position) located more downstream by a predetermined distance than the end 22*c* of the swing tray 22 located upstream in the sheet transport direction. When the trailing edge Se reaches the transfer position, the FD transport member 15 is stopped.

The travel distance of the FD transport member 15 required for the stack of sheets Sb to be transported to the transfer position is calculated based on the distance (L2-L1), which is the difference between L1 and L2. Here, L1 denotes the distance required for the stack of sheets Sb after alignment to be transported to the stapling position. L2 denotes the distance from the stoppers 18*a* and 18*b* to the trailing edge Se of the stack of sheets Sb positioned at the transfer position. L1 and L2 are determined in advance, and L1 is determined based on the size of the sheets S. Accordingly, finding out the size of the sheets S allows determination of the travel distance of the FD transport member 15.

After the stack of sheets Sb is transported to the transfer position, the stack of sheets Sb is no longer placed on the fixed tray 21, but is placed on the swing tray 22 instead.

Figure 8:
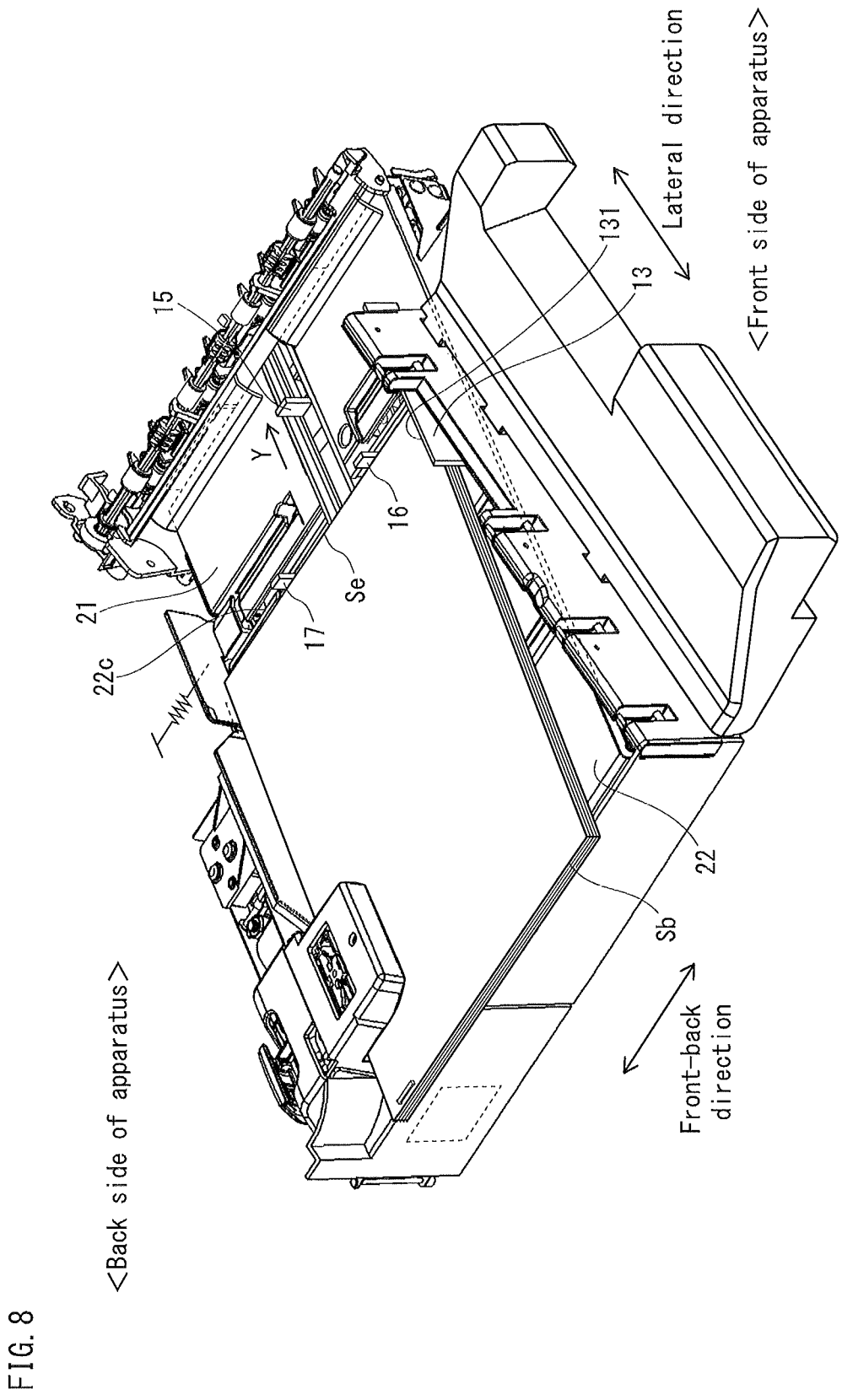
FIG. 8 is a schematic perspective view showing a state where two guide claws are switched to a protruding state.

Upon completion of the transport of the stack of sheets Sb to the transfer position, as shown in FIG. 8, the guide claws 16 and 17 provided at the end 22*c* of the swing tray 22 located upstream in the sheet transport direction are switched from the housed state to the protruding state. Then, the FD transport member 15 returns to the home position by moving in the direction indicated by arrow Y.

The positional relationship between the guide claws 16 and 17 in the protruding state, the trailing edge Se of the stack of sheets Sb located at the transfer position, and the end 22*c* of the swing tray 22 is such that the guide claws 16 and 17 in the protruding state are between the trailing edge Se of the stack of sheets Sb and the end 22*c* of the swing tray 22.

When the FD transport member 15 moves in the direction indicated by arrow Y, the stack of sheets Sb placed on the swing tray 22 in an inclined state tends to slip toward the fixed tray 21. However, since the slip is regulated by the guide claws 16 and 17 in the protruding state, the stack of sheets Sb remains on the swing tray 22.

After the CD alignment plate 13 returns to the home position by moving toward the front side of the apparatus, the end 22*c* of the swing tray 22 located upstream in the sheet transport direction is lifted about the shaft 22*b* as a fulcrum. In this way, the swing tray 22 in the inclined state transitions to the horizontal state.

When the swing tray 22 is placed in the horizontal state, the entirety of a side edge 22*g* of the sheet placement surface 22*a* of the swing tray 22, which is a side edge closer to the front side of the apparatus, is located above an upper edge 53 of the upstanding wall 51*b* of the second housing 102. This positional relationship in the up-and-down direction is determined in advance.

The CD reference plate 12, the stapler 103, and the guide claws 16 and 17 integrally swing with the swing tray 22. On the other hand, the CD alignment plate 13 and the CD reference plate 29 do not swing along the swing tray 22 since the CD alignment plate 13 and the CD reference plate 29 are supported by the fixed tray 21.

The magnitude relationship between the swing range of the swing tray 22 in the up-and-down direction and the height of the CD alignment plate 13 in the up-and-down direction is also determined in advance, so that when the swing tray 22 is in the horizontal state, an upper edge 131 of the CD alignment plate 13 is located lower than the swing tray 22.

Suppose that the swing tray 22 is in the inclined state. In this case, regarding the side edge 22*g* of the sheet placement surface 22*a* closer to the front side of the apparatus, an edge portion 22*m* (first side edge portion), which is one end of the side edge 22*g* located downstream in the sheet transport direction, is positioned above the upper edge 53 of the upstanding wall 51*b* of the second housing 102. Also, an edge portion 22*n* (second side edge portion), which is one end of the side edge 22*g* located upstream in the sheet transport direction, is positioned below the upper edge 53 of the upstanding wall 51*b*.

When the swing tray 22 is in the horizontal state, the CD reference plate 29 is disengaged from the CD reference plate 12. As a result, only the CD reference plate 29 returns to the home position by the biasing force of the tension spring 28.

Figure 10:
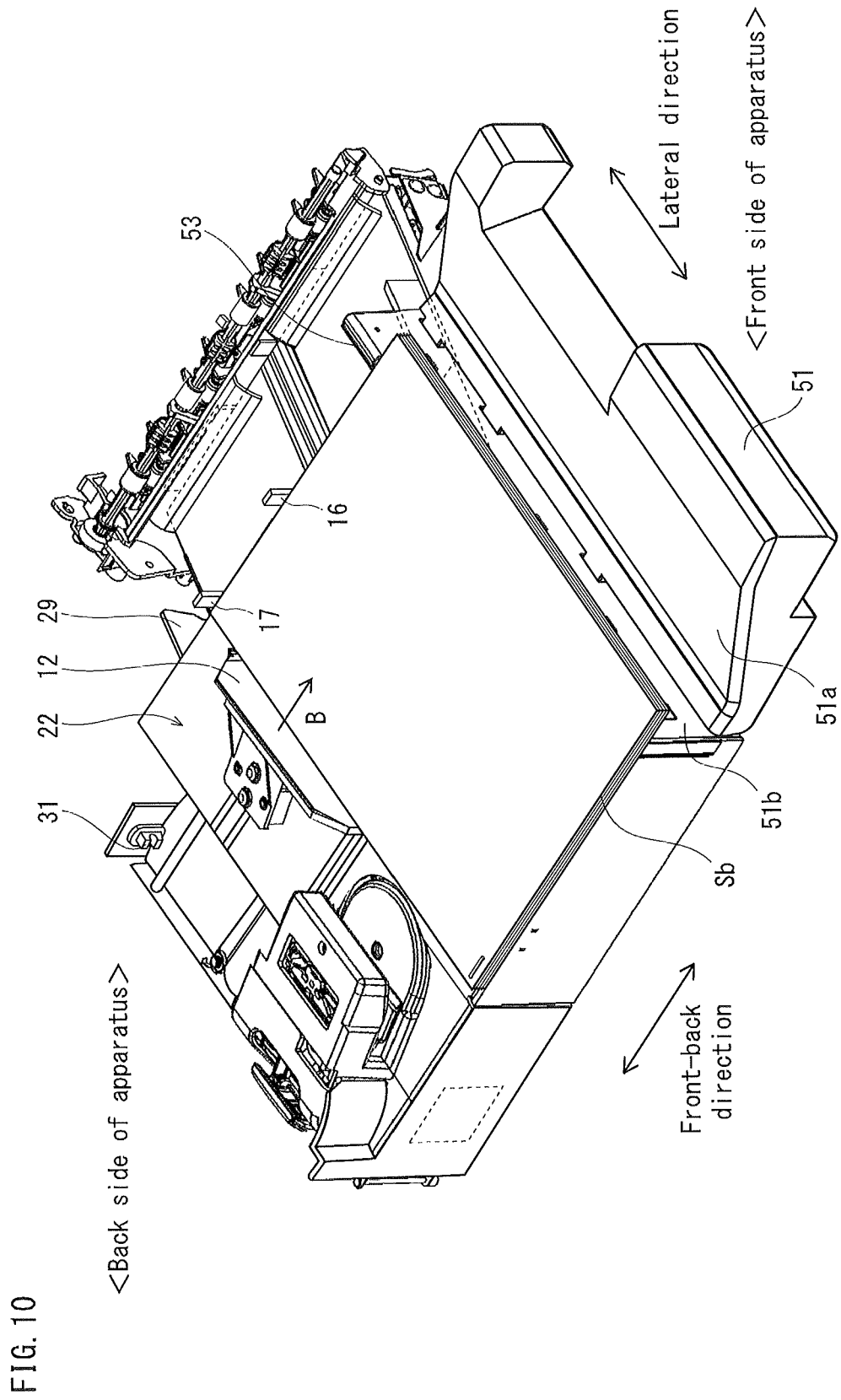
FIG. 10 is a schematic perspective view showing a stack of sheets on the swing tray is transferred to the front side of the apparatus.

After the swing tray 22 transitions to the horizontal state, the CD reference plate 12 moves from the back side of the apparatus to the front side of the apparatus in the direction indicated by arrow B, as shown in FIG. 10. In this way, the stack of sheets Sb placed on the swing tray 22 in the horizontal state passes above the upper edge 53 of the upstanding wall 51*b*, and is transferred to the front tray 51 located at the front side of the apparatus. Note that when the swing tray 22 is in the horizontal state, the swing tray 22 is located above the CD alignment plate 13. Accordingly, the CD alignment plate 13 is placed out of the way when the stack of sheets Sb is transferred to the front side of the apparatus.

Figure 11:
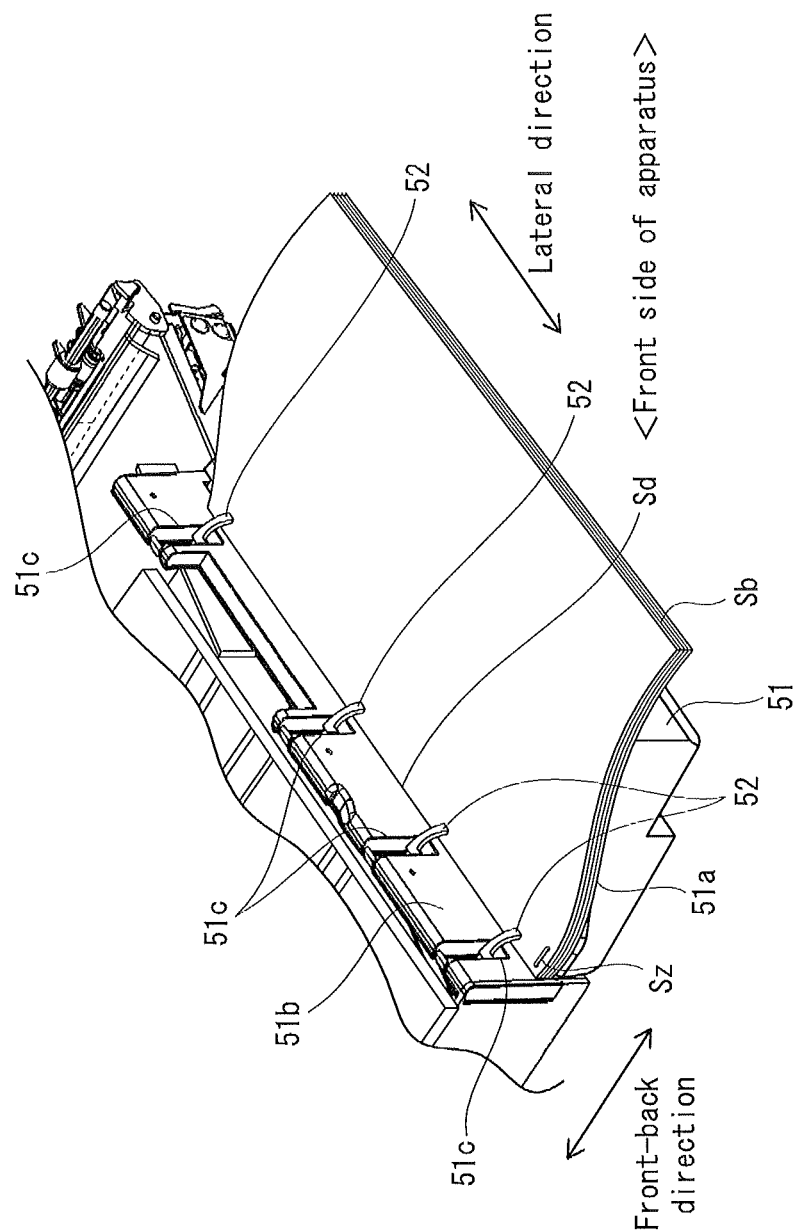
FIG. 11 is a schematic perspective view showing a state where a stack of sheets transferred from the swing tray is housed in the front tray.

When the CD reference plate 12 has moved closest to the front side of the apparatus, the stack of sheets Sb on the swing tray 22 in the horizontal state is moved onto the front tray 51, and is placed on the sheet placement surface 51*a* of the front tray 51, as shown in FIG. 11.

The stack of sheets Sb placed on the sheet placement surface 51*a* of the front tray 51 slips toward the back side of the apparatus along the inclination of the sheet placement surface 51*a*. However, the side edge Sd of the stack of sheets Sb at the back side of the apparatus (i.e., the leading end of the stack of sheets Sb in the slip direction) makes contact with the upstanding wall 51*b* arranged closer to the back side of the apparatus, whereby the slip of the stack of sheets Sb is regulated by the upstanding wall 51*b*.

As a result, the stack of sheets Sb on the sheet placement surface 51*a* comes to rest in a state where the side edge Sd at the back side of the apparatus is in contact with the upstanding wall 51*b*. In this respect, the upstanding wall 51*b* serves as a regulation member for regulating the stack of sheets Sb on the sheet placement surface 51*a*.

Note that it suffices if the stack of sheets Sb on the swing tray 22 in the horizontal state is transferred to the sheet placement surface 51*a* of the front tray 51 without being blocked by the upstanding wall 51*b*. In this sense, the positional relationship in the up-and-down direction between the sheet placement surface 22*a* of the swing tray 22 in the horizontal state and the upper edge 53 of the upstanding wall 51*b* may not necessarily be as described above. Instead, the positional relationship may be such that the side edge 22*g* of the sheet placement surface 22*a* is at the same position as the upper edge 53 of the upstanding wall 51*b*, for example.

Also, the swing tray 22 may not necessarily be in the horizontal state as long as the swing tray 22 is in the state that allows for the transfer of the stack of sheets Sb (i.e., transfer state). For example, the swing tray 22 may be in a forward inclined state where the side edge of the swing tray 22 closer to the back side of the apparatus is higher than the side edge 22*g* of the swing tray 22 closer to the front side of the apparatus. This can be realized by incorporating a mechanism that allows the swing tray 22 to be inclined forward in the front-back direction of the apparatus into the mechanism that allows the swing tray 22 to swing in the up-and-down direction.

Suppose that the user specifies a plurality of copies to be stapled. In this case, a series of processes, i.e., alignment of a stack of sheets Sb, stapling, transition of the swing tray 22 to the horizontal state, and transfer of the stack of sheets Sb from the swing tray 22 to the front tray 51, are sequentially performed on a per-copy basis.

In this case, as shown in FIG. 11, when a first stack of sheets Sb is housed in the front tray 51, the holding claws 52 protrude from the respective cuts 51c of the upstanding wall 51b and press the first stack of sheets Sb housed in the front tray 51 from above. In this way, the first stack of sheets Sb is placed in a held state.

The holding claws 52 return to the housed state (see FIG. 3) immediately before the next stack of sheets Sb is transferred to the front tray 51. The switching of the holding claws 52 between the housed state and the protruding state is performed, for example, by the drive force of a holding claw drive actuator 37 (see FIG. 12) that is a solenoid. In the present example, when the holding claw drive actuator 37 is driven, the tips of the respective holding claws 52 protrude from the upstanding wall 51b to press down the stack of sheets Sb. When the driving of the holding claw drive actuator 37 stops, the holding claws 52 return to the housed state by the biasing force of a tension spring (not shown).

When the second stack of sheets Sb is transferred to the front tray 51 and placed on the first stack of sheets Sb already housed in the front tray 51, the four holding claws 52 press down the two stacks of sheets Sb once again so that the two stacks of sheets Sb, one on top of the other, are placed in the held state. Thereafter, if stapling on a per-copy basis continues, the above operations are repeated for each copy. When a job is completed, the holding claws 52 return to the housed state, and the stacks of sheets Sb are released from the held state to be free from being pressed down. In a case where stapling is performed on only one copy, pressing of the stack of sheets Sb by the holding claws 52 is performed only once, and the holding claws 52 then return to the housed state.

With the above operations, at least one stapled stack of sheets Sb is housed in the front tray 51 provided at the front side of the apparatus. Accordingly, the user can easily take the stack of sheets Sb housed in the front tray 51 from the front side of the apparatus.

Note that when transfer of the stack of sheets Sb from the swing tray 22 to the front tray 51 is completed, the CD reference plate 12 moves from the front side of the apparatus to the back side of the apparatus to return to the home position. When the CD reference plate 12 returns to the home position, the swing tray 22 descends to return to the inclined state.

When the CD reference plate 12 returns to the home position, the protrusion 12a (FIG. 3) of the CD reference plate 12 is positioned at the back of the CD reference plate 29 located at the home position. When the CD reference plate 12 moves to the front side of the apparatus once again, the protrusion 12a makes contact with the surface 29a of the CD reference plate 29 closer to the back side of the apparatus. As a result, the CD reference plate 12 is engaged with the CD reference plate 29 again.

In the above, description is provided on a case of performing a stapling job where a stack of sheets Sb is stapled. However, in a case of performing a printing job where stapling is not performed and images are printed on a plurality of sheets S, the operation of stapling is omitted from the above operations, and the rest of the operations, i.e., alignment of the stack of sheets Sb, transport of the stack of sheets Sb to the swing tray 22, transition of the swing tray 22 to the horizontal state, and transfer of the stack of sheets Sb from the swing tray 22 to the front tray 51, are performed.

If, for example, a print job is performed on only one sheet S, the operations of alignment and stapling are omitted from the above operations, and the rest of the operations, i.e., transport of the sheet S to the swing tray 22, transition of the swing tray 22 to the horizontal state, and transfer of the sheet S from the swing tray 22 to the front tray 51, are performed.

<Structure of Each of Control Systems for Image Forming Apparatus 1 and Sheet Post-Processing Device 2>

Figure 12:
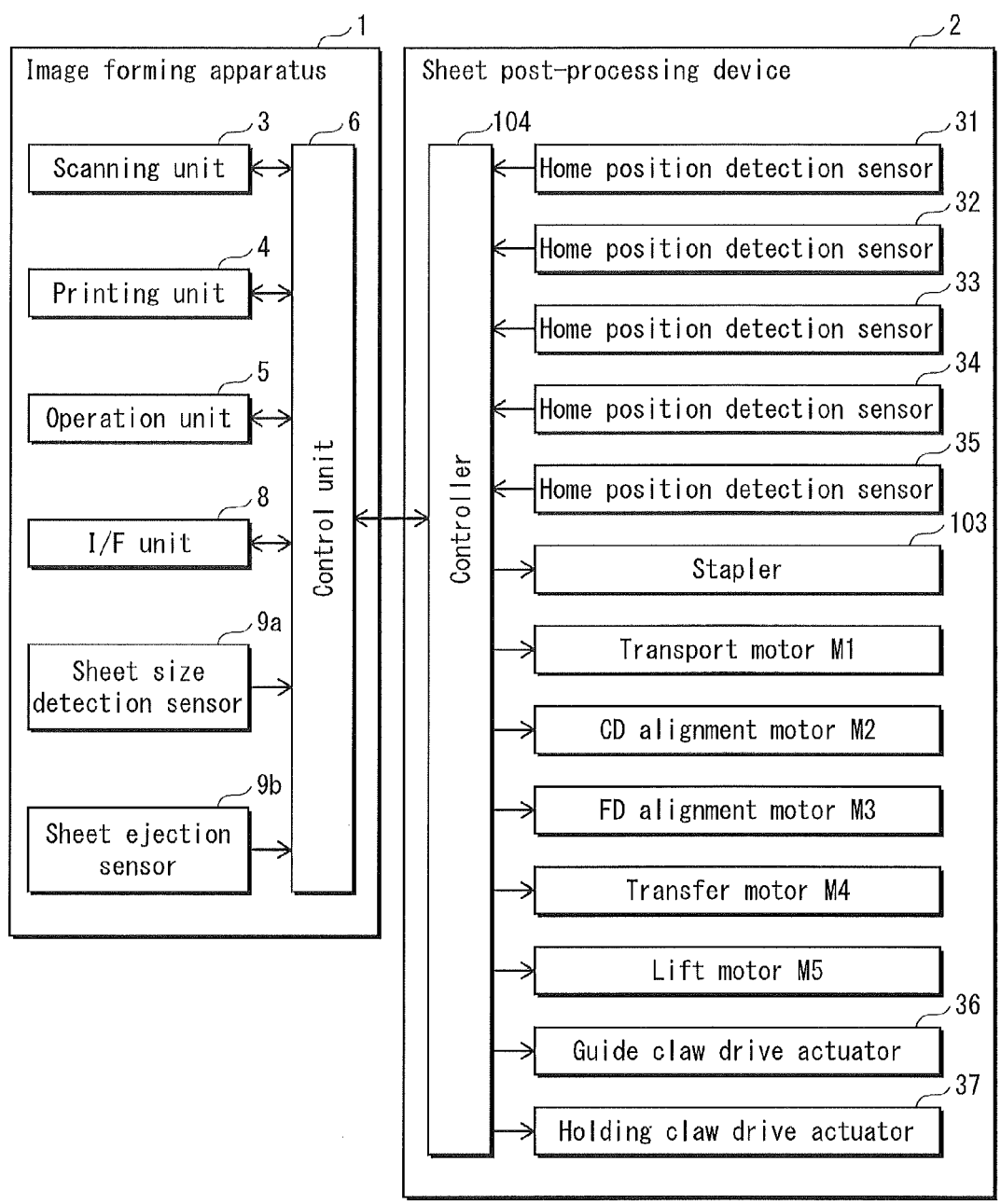
FIG. 12 is a block diagram for explaining the structure of each of the control systems for the image forming apparatus and the sheet post-processing device.

FIG. 12 is a block diagram for explaining the structure of each of the control systems for the image forming apparatus 1 and the sheet post-processing device 2.

As shown in FIG. 12, the control unit 6 of the image forming apparatus 1 controls the scanning unit 3 and the printing unit 4 to perform a scan job and a copy job, respectively. Also, upon receiving data on a print job from an external terminal connected to a network via an external interface (I/F) unit 8, the control unit 6 causes the printing unit 4 to perform the print job based on the received data.

Also, upon receiving a stapling execution instruction from the user via the operation unit 5, the control unit 6 transmits, to the controller 104 of the sheet post-processing device 2, information on the number of sheets S to be stapled (staple sheet count), the number of copies specified, etc.

Furthermore, the control unit 6 receives a detection signal from a sheet size detection sensor 9a provided at the cassette 4a of the printing unit 4, and thereby detects the size of sheets S housed in the cassette 4a and the transport orientation (portrait or landscape) of the sheets S. The size and the transport orientation detected by the sheet size detection sensor 9a constitute sheet information transmitted to the controller 104 of the sheet post-processing device 2.

Also, upon receiving, from a sheet ejection sensor 9b (see FIG. 3) provided in the vicinity of the ejection roller 7, a detection signal indicating the trailing edge of a sheet S ejected by the ejection roller 7 (i.e., sheet trailing edge), the control unit 6 detects that the sheet S has been ejected by the ejection roller 7 after printing. Every time ejection of a sheet S after printing is detected, the control unit 6 transmits a sheet ejection signal indicating the ejection of the sheet S to the controller 104 of the sheet post-processing device 2.

The controller 104 of the sheet post-processing device 2 performs control and causes the stapler 103, the transport motor M1 to the lift motor M5, the guide claw drive actuator 36, the holding claw drive actuator 37, etc. to perform operations such as alignment of a stack of sheets Sb, stapling, switching of the swing tray 22 between the inclined state and the horizontal state, and transfer of the stack of sheets Sb from the swing tray 22 to the front tray 51.

Also, the controller 104 receives a detection signal from a home position detection sensor 31 (see FIG. 10) for detecting that the CD reference plate 12 is at the home position, and thereby detects whether the CD reference plate 12 is at the home position.

As the home position detection sensor 31, it is possible to use an optical sensor having a light-emitter and a light receiver which are arranged with a space therebetween, for example.

When the optical sensor is used, the following detection method may be employed.

That is, when the CD reference plate 12 is at the home position, a shielding member (not shown) that integrally moves with the CD reference plate 12 is positioned between the light emitter and the light receiver. As a result, the light from the light emitter is shielded by the shielding member, and the light receiver cannot receive the light. In this case, the home position detection sensor 31 outputs an OFF signal. On the other hand, when the CD reference plate 12 leaves the home position, the shielding member also leaves from the position between the light emitter and the light receiver. As a result, the light receiver can receive the light emitted from the light emitter. In this case, the home position detection sensor 31 outputs an ON signal.

The controller 104 detects which of the ON signal and the OFF signal is output from the home position detection sensor 31, and thereby detects whether the CD reference plate 12 is at the home position or not. It is possible to employ a detection method other than the aforementioned detection method to detect the home position. As for home position detection sensors 32 to 35 described below, the same detection method as described above may be employed to detect home positions.

The controller 104 receives a detection signal from the home position detection sensor 32 for detecting that the CD alignment plate 13 is at the home position, and thereby detects whether the CD alignment plate 13 is at the home position.

Also, the controller 104 receives a detection signal from the home position detection sensor 33 for detecting that the FD alignment member 14 is at the home position, and thereby detects whether the FD alignment member 14 is at the home position.

Furthermore, the controller 104 receives a detection signal from the home position detection sensor 34 for detecting that the FD transport member 15 is at the home position, and thereby detects whether the FD transport member 15 is at the home position.

Also, the controller 104 receives a detection signal from the home position detection sensor 35 for detecting that the swing tray 22 is placed in the inclined state (at the home position), and thereby detects whether the swing tray 22 is at the home position.

Furthermore, the controller 104 can exchange data and information with the control unit 6 of the image forming apparatus 1, and acquires, from the control unit 6, various pieces of information such as a stapling execution instruction and a specification on the number of copies given by the user, sheet information detected by the image forming apparatus 1, etc.

<Details of Stapling Control by Sheet Post-Processing Device 2>

Figure 13:
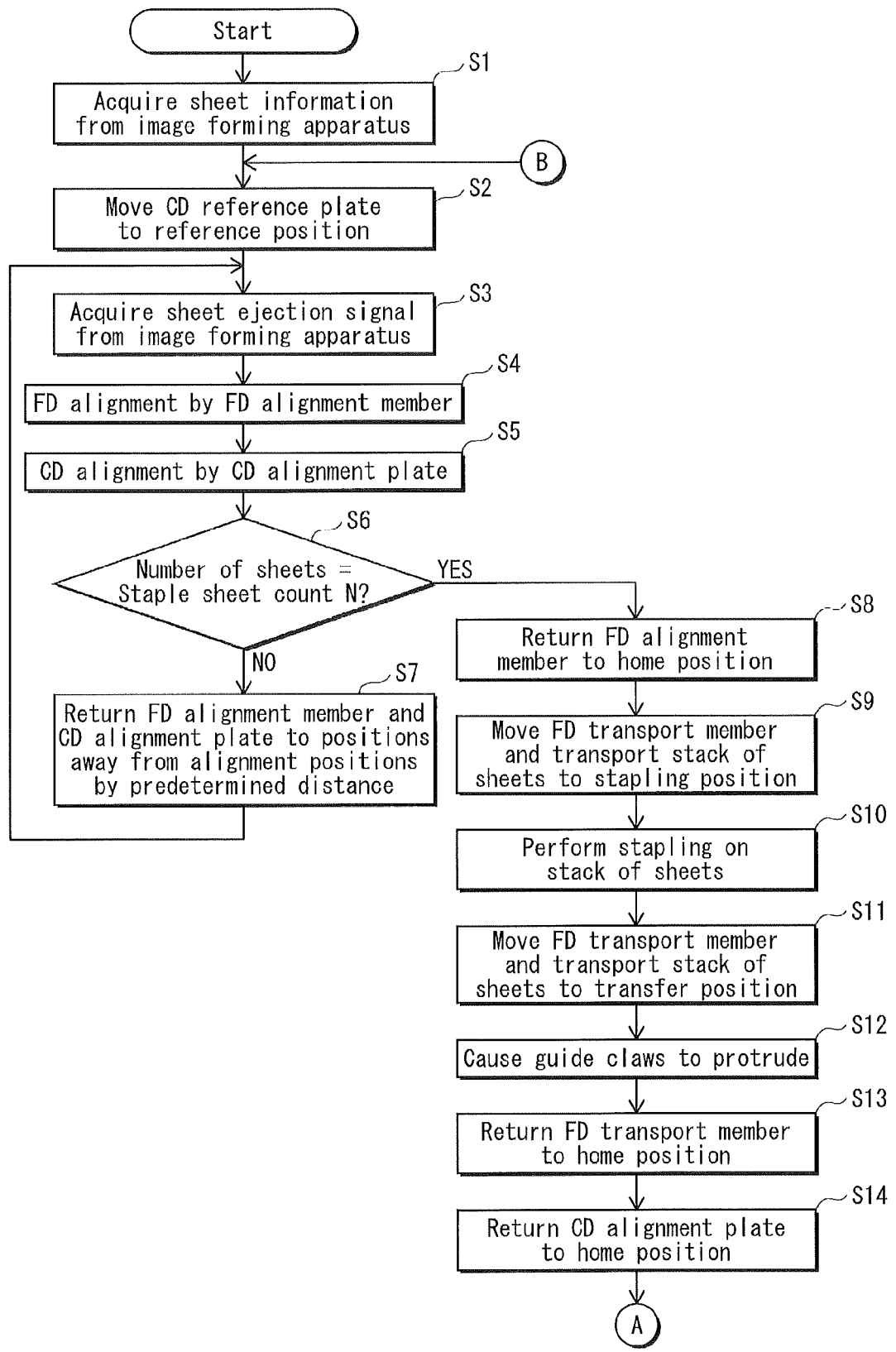
FIG. 13 is a flowchart showing a part of a stapling control performed by the sheet post-processing device.
Figure 14:
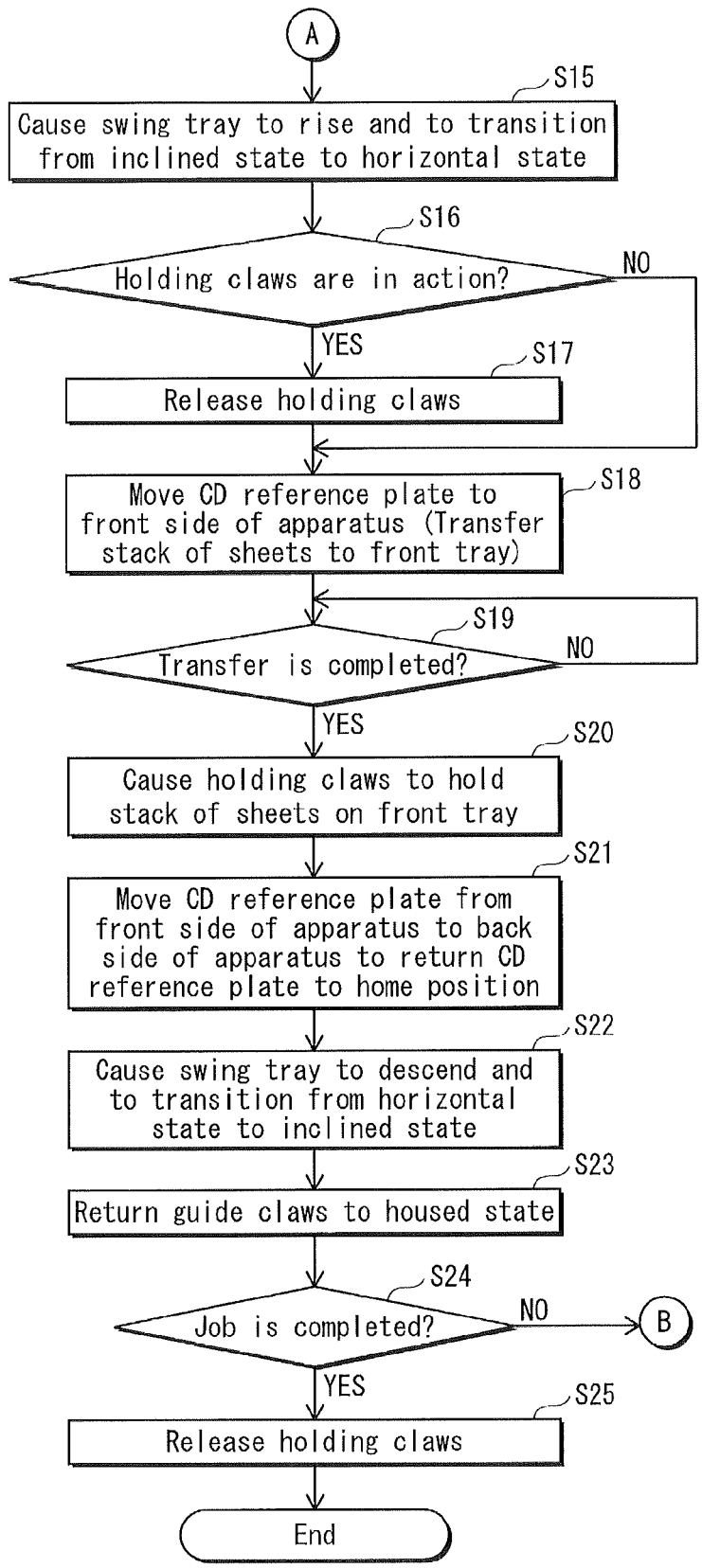
FIG. 14 is a flowchart showing the rest of the stapling control performed by the sheet post-processing device.

FIGS. 13 and 14 are each a flowchart showing a stapling control by the sheet post-processing device 2. The stapling control is performed when the controller 104 receives a stapling instruction from the control unit 6 of the image forming apparatus 1.

As shown in FIG. 13, the controller 104 acquires sheet information on a sheet S ejected from the image forming apparatus 1 (step S1).

Then, the controller 104 causes the CD reference plate 12 to move from the home position to the reference position (step S2).

The movement of the CD reference plate 12 is performed by driving the transfer motor M4 to rotate in the normal direction by a predetermined number of rotations or rotational angles. The predetermined number of rotations or rotational angles is determined in advance as the number of rotations or rotational angles of the transfer motor M4 corresponding to a predetermined distance from the home position to the reference position. Movement of the CD reference plate 12 to the reference position causes movement of the CD reference plate 29 to the reference position as well.

Subsequently, upon acquiring a sheet ejection signal for the first sheet S from the image forming apparatus 1 (step S3), the controller 104 recognizes that the first sheet S is transported onto the post-processing tray 11, and performs FD alignment by using the FD alignment member 14 (step S4), and performs CD alignment by using the CD alignment plate 13 (step S5) (see FIG. 4).

FD alignment by the FD alignment member 14 is performed by the operation where the FD alignment member 14 moves from the home position to the FD alignment position. The FD alignment position corresponds to the sheet length L that is based on the sheet information.

The travel distance of the FD alignment member 14 from the home position to the FD alignment position is determined in advance for each sheet length L. The movement of the FD alignment member 14 is performed by driving the FD alignment motor M3 to rotate in the normal direction by the number of rotations or rotational angles of the FD alignment motor M3 corresponding to the travel distance of the FD alignment member 14 from the home position to the FD alignment position corresponding to the sheet length L.

CD alignment by the CD alignment plate 13 is performed by the operation where the CD alignment plate 13 moves from the home position to the CD alignment position. The CD alignment position corresponds to the sheet width W that is based on the sheet information.

The travel distance of the CD alignment plate 13 from the home position to the CD alignment position is determined in advance for each sheet width W. The movement of the CD alignment plate 13 is performed by driving the CD alignment motor M2 to rotate in the normal direction by the number of rotations or rotational angles of the CD alignment motor M2 corresponding to the travel distance of the CD alignment plate 13 from the home position to the CD alignment position corresponding to the sheet width W.

The controller 104 judges whether the number of sheets S (sheet count) ejected from the image forming apparatus 1 is equal to the number of sheets S to be stapled (staple sheet count) N (step S6).

When the sheet count is not equal to the staple sheet count N ("NO" in step S6), the controller 104 causes each of the FD alignment member 14 and the CD alignment plate 13 to return to the position away from the alignment position by a predetermined distance (10 mm in the above example) toward the home position (step S7), and wait for the second sheet S to be transported.

The operation of returning the FD alignment member 14 and the CD alignment plate 13 to the positions closer to the respective home positions by a predetermined distance is performed by driving the FD alignment motor M3 and the CD alignment motor M2 to rotate in the reverse direction by the number of rotations or rotational angles of the FD alignment motor M3 and the CD alignment motor M2 corresponding to the predetermined distance from each of the alignment positions.

Upon acquiring a sheet ejection signal for a second sheet S from the image forming apparatus 1 (step S3), the controller 104 performs steps S4 and S5 to align the first sheet S and the second sheet S placed on the first sheet S, and proceeds to step S6.

When judging that the sheet count is not equal to the staple sheet count N ("NO" in step S6), the controller 104 performs steps S7, and S3 to S6 again. The controller 104 repeatedly performs steps S3 to S7 until the sheet count is judged to be equal to the staple sheet count N.

When judging that the sheet count is equal to the staple sheet count N ("YES" in step S6), the controller 104 performs an operation of returning the FD alignment member 14 to the home position (step S8) (see FIG. 5).

The operation of returning the FD alignment member 14 to the home position is performed by driving the FD alignment motor M3 to rotate in the reverse direction, and stopping the FD alignment motor M3 when the home position detection sensor 33 detects the FD alignment member 14.

Next, the controller 104 moves the FD transport member 15 so that the stack of sheets Sb on the post-processing tray 11 is transported to the stapling position (step S9) (FIG. 6).

The transport of the stack of sheets Sb to the stapling position is performed by moving the FD transport member 15 by driving the transport motor M1 to rotate in the normal direction. Specifically, the transport motor M1 is driven to rotate by the number of rotations or rotational angles of the transport motor M1 corresponding to a transport distance determined based on the stapling position information.

When the stack of sheets Sb is transported to the stapling position, the controller 104 causes the stapler 103 to staple the stack of sheets Sb (step S10).

Figure 7:
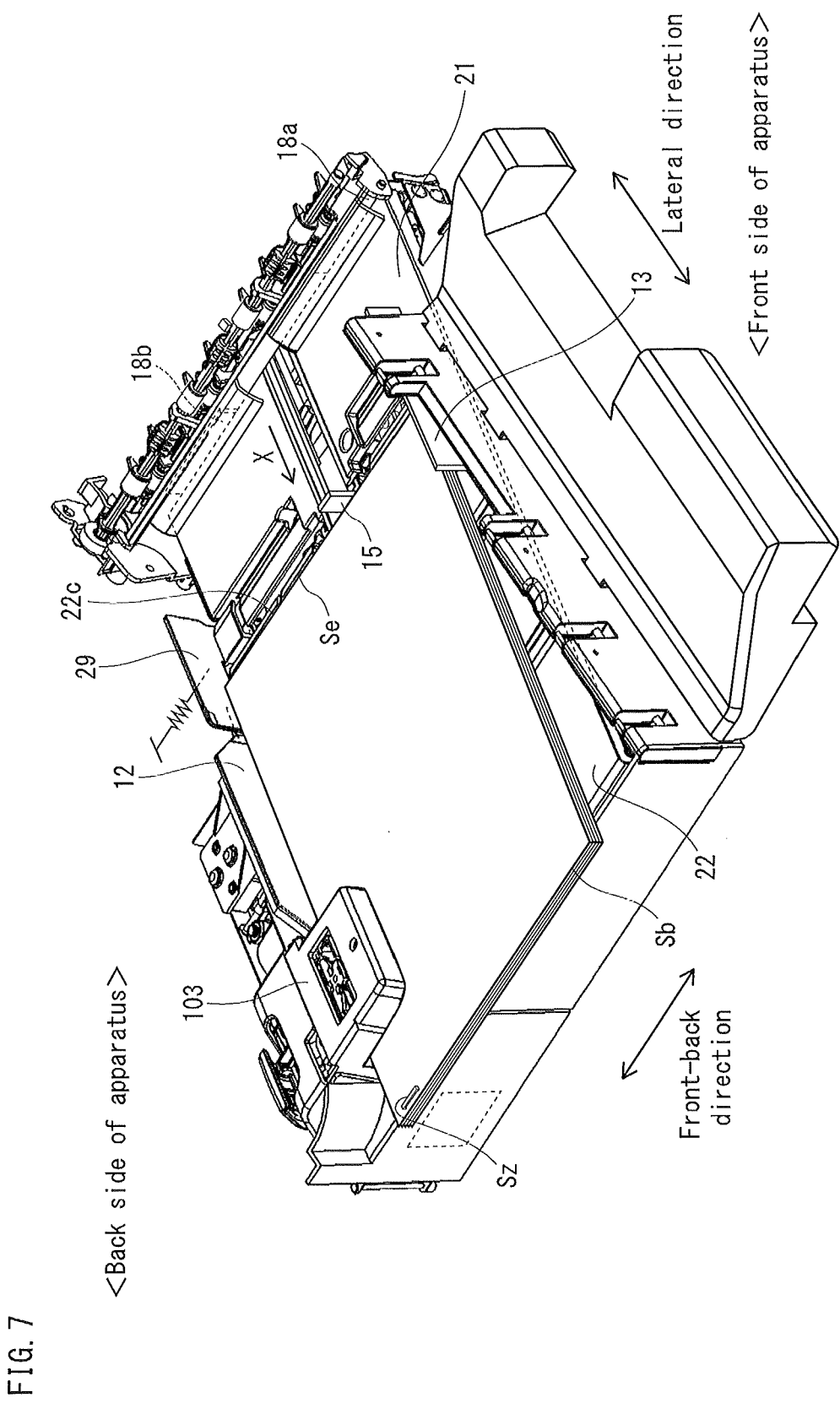
FIG. 7 is a schematic perspective view showing a state where a stack of sheets that has been stapled is transported by the FD transport member to a transfer position.

After the stack of sheets Sb is stapled, the controller 104 causes the FD transport member 15 to further move, so that the stapled stack of sheets Sb is transported to the transfer position for the transfer to the front side of the apparatus (step S11) (see FIG. 7).

The transport of the stack of sheets Sb to the transfer position is performed by moving the FD transport member 15 by driving the transport motor M1 to rotate in the normal direction. Specifically, the transport motor M1 is driven to rotate by the number of rotations or rotational angles of the transport motor M1 corresponding to the transport distance of the stack of sheets Sb to the transfer position. The transport distance of the stack of sheets Sb to the transfer position is specified based on the distance (L2-L1) as described above.

Then, the controller 104 switches the guide claws 16 and 17 from the housed state to the protruding state (step S12) (see FIG. 8). The switching is performed by the drive of the guide claw drive actuator 36.

When switching of the guide claws 16 and 17 from the housed state to the protruding state is completed, the controller 104 performs an operation of returning the FD transport member 15 to the home position (step S13).

The operation of returning the FD transport member 15 to the home position is performed by driving the transport motor M1 to rotate in the reverse direction, and stopping the transport motor M1 when the home position detection sensor 34 detects the FD transport member 15.

Next, the controller 104 performs an operation of returning the CD alignment plate 13 to the home position (step S14).

The operation of returning the CD alignment plate 13 to the home position is performed by driving the CD alignment motor M2 to rotate in the reverse direction, and stopping the CD alignment motor M2 when the home position detection sensor 32 detects the CD alignment plate 13.

Figure 9:
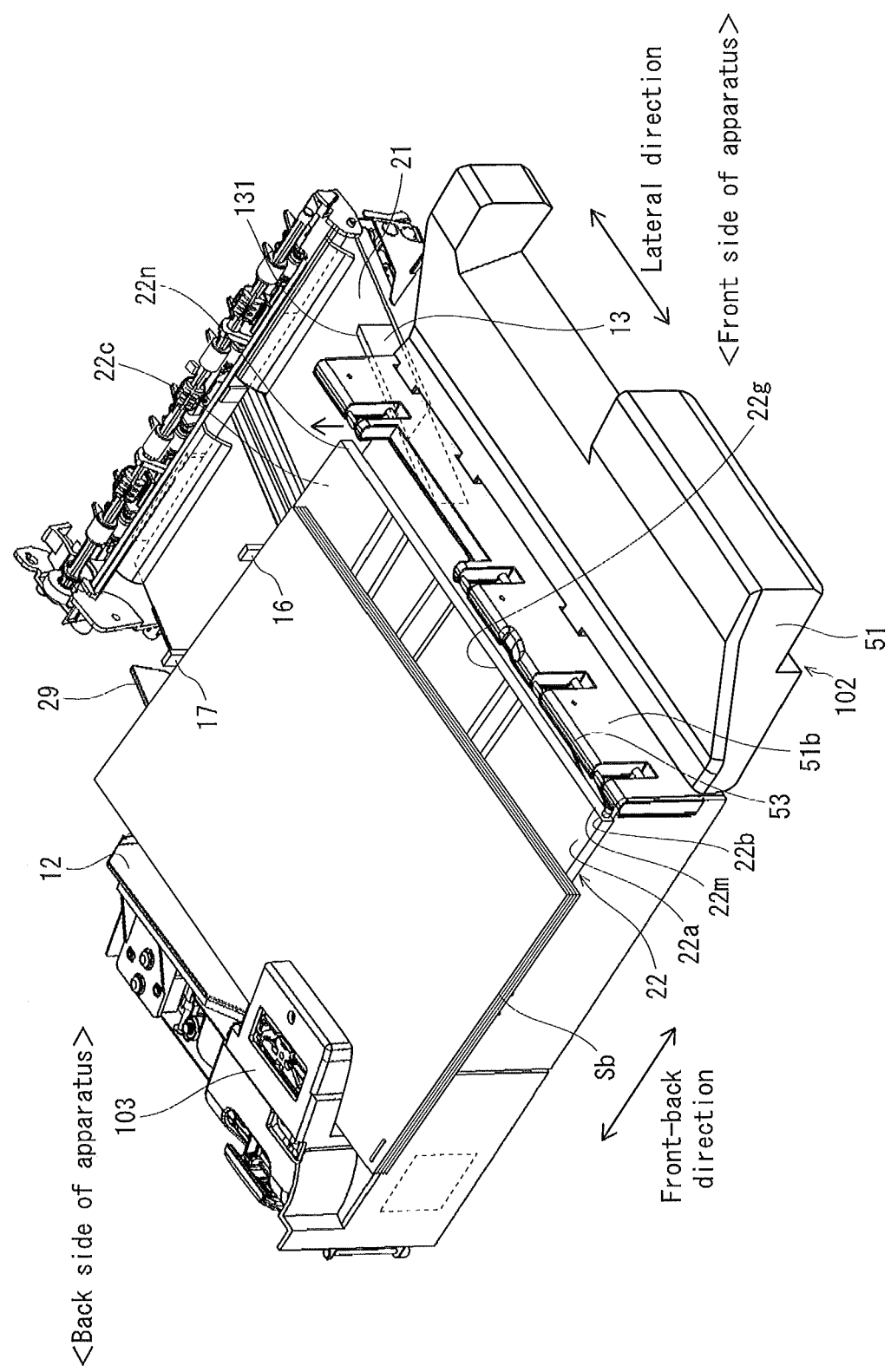
FIG. 9 is a schematic perspective view showing a state where a swing tray transitions to a horizontal state.

Then, in step S15 in FIG. 14, the controller 104 causes the swing tray 22 to rise and transition from the inclined state to the horizontal state (see FIG. 9).

The transition of the swing tray 22 from the inclined state to the horizontal state is performed by driving the lift motor M5 to rotate in the normal direction by a predetermined number of rotations or rotational angles of the lift motor M5 required to change the state of the swing tray 22 from the inclined state to the horizontal state.

The controller 104 judges whether the four holding claws 52 provided at the upstanding wall 51b are in action and are holding the stack of sheets Sb (step S16). The holding of the stack of sheets Sb by the holding claws 52 is performed in step S20 described below.

In the present example, the controller 104 judges that the holding claws 52 are not in action ("NO" in step S16), causes the CD reference plate 12 to move from the back side of the apparatus to the front side of the apparatus, and transfers the stack of sheets Sb on the swing tray 22 to the front side of the apparatus (step S18) (see FIG. 10). The transfer of the stack of sheets Sb is performed by driving the transfer motor M4 to rotate in the normal direction.

The movement of the CD reference plate 12 from the back side of the apparatus to the front side of the apparatus is performed by driving the transfer motor M4 to rotate in the normal direction by the number of rotations or rotational angles of the transfer motor M4 corresponding to a predetermined distance traveled by the CD reference plate 12. Here, the predetermined distance is a distance from the reference position of the CD reference plate 12 to the position closest to the front side of the apparatus.

When the CD reference plate 12 moves closest to the front side of the apparatus and the stack of sheets Sb has been transferred to the front side of the apparatus ("YES" in step S19), the controller 104 determines that the stack of sheets Sb is housed in the front tray 51, and causes the four holding claws 52 to hold the stack of sheets Sb (step S20) (see FIG. 11). The holding operation of the stack of sheets Sb by the holding claws 52 is performed by the drive of the holding claw drive actuator 37.

Then, the controller 104 causes the CD reference plate 12 to move from the front side of the apparatus to the back side of the apparatus so as to return the CD reference plate 12 to the home position (step S21). The operation of returning the CD reference plate 12 to the home position is performed by driving the transfer motor M4 to rotate in the reverse direction, and stopping the transfer motor M4 when the home position detection sensor 31 detects the CD reference plate 12.

When the CD reference plate 12 returns to the home position, the controller 104 causes the swing tray 22 to descend and transition from the horizontal state to the inclined state (step S22).

The transition of the swing tray 22 from the horizontal state to the inclined state is performed by driving the lift motor M5 to rotate in the reverse direction, and stopping the lift motor M5 when the home position detection sensor 35 detects that the swing tray 22 is switched back to the inclined state.

Then, the controller 104 causes the guide claws 16 and 17 to return to the housed state (step S23). The transition to the housed state is performed by stopping the drive of the guide claw drive actuator 36.

Next, the controller 104 judges whether the job is completed (step S24). When judging that the job is not completed ("NO" in step S24), the controller 104 returns to step S2 in FIG. 13 in order to staple the second stack of sheets Sb, and performs the process from step S2 onward.

Upon completion of stapling to the second stack of sheets Sb (step S10), the controller 104 causes the swing tray 22 to transition to the horizontal state (step S15), and judges whether the four holding claws 52 are in action to hold the stack of sheets Sb (step S16). In the present example, the controller 104 judges that the holding claws 52 are in action ("YES" in step S16) since the first stack of sheets Sb is being held by the holding claws 52 (step S20 above), and releases the holding of the stack of sheets Sb by the holding claws 52 (step S17). The release of the holding by the holding claws 52 is performed by stopping the drive of the holding claw drive actuator 37. This results in the holding claws 52 being placed in the housed state.

When holding of the stack of sheets Sb by the holding claws 52 is released, the controller 104 transfers the second stack of sheets Sb on the swing tray 22 onto the front tray 51 (step S18).

As a result, the second stack of sheets Sb is placed within the front tray 51, or to be more specific, on the first stack of sheets Sb already housed in the front tray 51. With the second stack of sheets Sb being placed on the first stack of sheets Sb, the holding claws 52 hold these stacks of sheets Sb again (step S20).

In step S24, if judging that the job is not completed and that the third stack of sheets Sb needs to be stapled ("NO" in step S24), the controller 104 returns to step S2 again, and performs steps S2 to S24.

The controller 104 repeatedly performs steps S2 to S24 for each copy, i.e., each stack of sheets, until the controller 104 judges that the job is completed. When every stack of sheets Sb has been stapled and transferred to the front side of the apparatus, the controller 104 judges that the job is completed ("YES" in step S24), releases the holding of the stack of sheets Sb by the holding claws 52 (step S25), and ends the stapling control.

In the above example, stapling is performed on a stack of sheets Sb. However, if stapling is not performed, steps S9 and S10 are omitted from the above control. Also, in the case of a print job in which an image is printed on only one sheet S instead of a stack of sheets Sb, steps S3, S11, S12, S13, S15, S18, S19, S21, and S22 are performed in this order, and the control is then ended.

As described above, according to the present embodiment, the sheet post-processing device 2 is provided in the space 1a between the scanning unit 3 and the printing unit 4 of the image forming apparatus 1. In the sheet post-processing device 2, a sheet S ejected from the image forming apparatus 1 or a stack of sheets Sb composed of a plurality of sheets S ejected from the image forming apparatus 1 is temporarily housed in the post-processing tray 11 at the back side of the apparatus. Thereafter, the sheet S or the stack of sheets Sb temporarily housed in the post-processing tray 11 is transferred from the back side of the apparatus to the front side of the apparatus so as to be housed in the front tray 51 provided closer to the front side of the apparatus than the post-processing tray 11.

With the above structure, the size of the image forming apparatus in the left-right (lateral) direction thereof can be reduced. Also, the user can easily take, from the front side of the apparatus, a sheet S or a stack of sheets Sb housed in the front tray 51. As a result, operability is improved.

Also, the post-processing tray 11, which temporarily houses a sheet S ejected by the ejection roller 7 of the printing unit 4, includes the swing tray 22 that is swingable up and down. The swing tray 22 is placed in the inclined state where the end 22c of the swing tray 22 is at the lowermost position, and the swing tray 22 thereby receives the sheet S ejected by the ejection roller 7. This structure makes it possible to reduce the height of the space 1a of the image forming apparatus 1 in the up-and-down direction.

The reason why the above structure is employed in the present embodiment is as follows. Suppose here that the swing tray 22 is omitted from the structure, and only a fixed tray in a horizontal state is employed. In this case, in order to transfer a stack of sheets Sb from the fixed tray to the front tray 51, the fixed tray needs to be provided at a position higher than the upstanding wall 51b of the front tray 51. In addition, in order to transport a sheet S to the fixed tray located higher than the upstanding wall 51b, the ejection roller 7 of the printing unit 4 needs to be provided even higher than the fixed tray. As a result, the size of the space 1a needs to be increased in the up-and-down direction to mount the sheet post-processing device 2.

According to the present embodiment, the swing range of the swing tray 22 in the up-and-down direction is substantially the same as the height of the upstanding wall 51b of the front tray 51 in the up-and-down direction, and a sheet S ejected by the ejection roller 7 of the printing unit 4 is received by the swing tray 22 when the swing tray 22 is in the inclined state where the end 22c of the swing tray 22 is at the lowermost position.

In this way, the position of the ejection roller 7 (sheet ejector) of the printing unit 4 in the up-and-down direction falls within the height range, in the up-and-down direction, of the upstanding wall 51b provided at the front tray 51 of the sheet post-processing device 2. As a result, the sheet post-processing device 2 can be mounted within the space 1a between the scanning unit 3 and the printing unit 4, according to the height position of the sheet outlet of the image forming apparatus 1.

Furthermore, the operation unit 5 of the image forming apparatus 1 is provided at the front side of the apparatus. Also, when the sheet post-processing device 2 is mounted in the image forming apparatus 1, the front tray 51 of the sheet post-processing device 2 is aligned with the operation unit 5 of the image forming apparatus 1 side by side in the left-right direction of the apparatus.

In this way, the user can give a job execution instruction by operating the operation unit 5 at the front side of the apparatus. Also, upon execution of the job, the user can take a printed sheet S or a stack of printed sheets Sb housed in the front tray 51. This further improves operability.

The present invention is not limited to the sheet post-processing device, and may be an image formation system including the image forming apparatus 1 and the sheet post-processing device 2 mounted therein.

Also, the present invention may be a sheet post-processing method executed by the sheet post-processing device. Furthermore, the present invention may be a program that causes a computer to execute the method. Also, a computer program according to the present invention may be recorded on computer-readable recording media, including for example a magnetic tape, a magnetic disk such as a flexible disk, and an optical recording medium such as DVD-ROM, DVD-RAM, CD-ROM, CD-R, MO or PD. The computer program may be produced and transferred in the form of such a recording medium, or may be transmitted and provided via various kinds of wired or wireless networks such as the Internet or broadcasting, an electrical communication, satellite communication, or the like.

(Modifications)

The present invention is described above based on the embodiment. However, the present invention is not limited to the embodiment as a matter of course. The following are possible modifications.

(1) According to the above embodiment, the fixed tray 21 of the post-processing tray 11 is located more upstream than the swing tray 22 in the sheet transport direction, and is aligned with the swing tray 22. However, the fixed tray 21 and the swing tray 22 may not be aligned in this order. For example, the fixed tray 21 and the swing tray 22 may be aligned in the reverse order, that is, the fixed tray 21 may be located more downstream than the swing tray 22 in the sheet transport direction.

In the aforementioned structure, the stoppers 18a and 18b, the shaft 22b of the swing tray 22, the FD alignment member 14, the FD transport member 15, the stapler 103, and so on are arranged in reverse positions in the left-right direction with respect to the positions described in the above embodiment.

For example, the shaft 22*b* of the swing tray 22 is positioned at the right side (the side closer to the ejection roller 7 in the lateral direction of the apparatus), and the left side (the side away from the ejection roller 7) of the swing tray 22 swings up and down about the shaft 22*b* as a fulcrum. A sheet S ejected by the ejection roller 7 is transported from the swing tray 22 in the inclined state to the fixed tray 21.

After a stack of sheets Sb is aligned, the stack of sheets Sb is transported to the stapling position by the movement of the FD transport member 15 in the right direction (the direction reverse to the direction in which the ejection roller 7 ejects sheets). Then, the stack of sheets Sb is stapled at the stapling position. Subsequently, the FD transport member 15 further moves in the right direction, and the stack of sheets Sb that has been stapled is thereby transported in the right direction to the transfer position. When the stack of sheets Sb is placed on the swing tray 22, the swing tray 22 transitions to the horizontal state, and the stack of sheets Sb is transferred to the front side of the apparatus.

(2) According to the above embodiment, the swing tray 22 that is swingable up and down is provided. However, no limitation is intended thereby. For example, instead of the swing tray 22, a horizontal tray that is movable up and down while maintaining the horizontal state may be provided.

In this case, a movement control in the up-and-down direction is performed on the horizontal tray, so that: when a sheet S is transported from the ejection roller 7 to the horizontal tray, the sheet placement surface of the horizontal tray is positioned lower than the upper edge 53 of the upstanding wall 51*b*; and when a stack of sheets on the horizontal tray is transferred to the front side of the apparatus, the sheet placement surface of the horizontal tray is positioned higher than or at the same level as the upper edge 53 of the upstanding wall 51*b* in the up-and-down direction.

Also, according to the above embodiment, the post-processing tray 11 includes the fixed tray 21 and the swing tray 22. However, no limitation is intended thereby. For example, the post-processing tray 11 may include an integrated tray that is the integration of the fixed tray 21 and the swing tray 22, and this integrated tray may be caused to swing. In this case, a stack of sheets Sb on the integrated tray may be subjected to FD alignment by the movement of the FD alignment member 14. Then, by the movement of the FD transport member 15, the stack of sheets Sb may be sequentially transported to the stapling position, and then to the transfer position for the transfer to the front side of the apparatus.

Furthermore, in the above description, the post-processing tray 11 is movable in up-and-down direction, and the front tray 51 does not move (i.e., fixed) in the up-and-down direction. However, no limitation is intended thereby, and at least one of the post-processing tray 11 and the front tray 51 may be movable (raised and lowered) in the up-and-down direction so as to change the positions of the post-processing tray 11 and the front tray 51 relative to each other.

It suffices if a sheet S (or a stack of sheets Sb) temporarily housed in the post-processing tray 11 of the first housing 101 at the back side of the apparatus can be transferred to the front tray 51 of the second housing 102 at the front side of the apparatus.

For example, the post-processing tray 11 may be fixed and the front tray 51 may be movable up and down. Except when a sheet S (or a stack of sheets Sb) is transferred to the front side of the apparatus, the front tray 51 may be at the home position which is at the same height as the post-processing tray 11 in the up-and-down direction. When a sheet S (or a stack of sheets Sb) is transferred to the front side of the apparatus, the front tray 51 may be lowered to a transfer position which is located lower than the home position. Also, the post-processing tray 11 and the front tray 51 may be both movable in the up-and-down direction. This can be realized by providing: a mechanism (e.g., cam mechanism) that supports an intended tray to be movable in the up-and-down direction; and a drive unit for giving a drive force in the up-and-down direction to the intended tray.

Note that if the height of the space 1*a* of the image forming apparatus 1 in the up-and-down direction is large enough, the post-processing tray 11 and the front tray 51 may both be configured to be immovable in the up-and-down direction (fixed), for example.

(3) According to the above embodiment, the CD reference plate 12 movable in the front-back direction of the apparatus also serves as the transport member for transporting the stack of sheets Sb on the swing tray 22 to the front tray 51 to simplify the structure. However, no limitation is intended thereby. For example, a member different from the CD reference plate 12 may be provided as a transport member.

Also, according to the above embodiment, the stapler 103 swings integrally with the swing tray 22. However, depending on the structure of the image forming apparatus, the stapler 103 may move independently from the swing tray 22, and may not move in the up-and-down direction.

(4) According to the above embodiment, the CD reference plates 12 and 29 and the CD alignment plate 13 are used as a pair of CD alignment member for CD alignment, and the CD alignment is performed by the CD alignment plate 13 moving in the front-back direction of the apparatus with respect to the CD reference plates 12 and 29 that are stopped. However, no limitation is intended thereby.

For example, the pair of CD alignment members that face each other in the front-back direction of the apparatus with the sheet S therebetween may both move to approach toward each other to perform CD alignment.

(5) According to the above embodiment, the edge 51*d* of the front tray 51 at the front side of the apparatus is located closer to the front side of the apparatus in the front-back direction of the apparatus than the edge 3*a* of the scanning unit 3 at the front side of the apparatus. However, no limitation is intended thereby.

For example, the edge 51*d* of the front tray 51 at the front side of the apparatus and the edge 3*a* of the scanning unit 3 at the front side of the apparatus may be positioned at the same distance relative to the front side of the apparatus. Alternatively, the edge 51*d* of the front tray 51 at the front side of the apparatus may be closer to the back side of the apparatus than the edge 3*a* of the scanning unit 3 at the front side of the apparatus.

(6) According to the above embodiment, the sheet mounting surface 51*a* of the front tray 51 is inclined downward from the front side of the apparatus to the back side of the apparatus. However, the front tray 51 may be inclined toward another direction.

For example, when viewed from the front side of the apparatus, the front tray 51 may be inclined in the left-right direction with the left side thereof being positioned downward and the right side thereof being positioned upward. In this case, a stopper for regulating the slip of the sheet S (equivalent to the upstanding wall 51*b* described above) is provided at the left end of the front tray 51. Alternatively, the inclination of the front tray 51 may be such that the right side thereof is positioned downward and the left side thereof is positioned upward.

(7) According to the above embodiment, the image forming apparatus 1 is a multiple function peripheral. However, the image forming apparatus 1 is not necessarily a multiple function peripheral and may be a copier, a fax machine, etc., as long as the image forming apparatus is configured such that the printing unit 4 (image forming unit) is located under the scanning unit 3 (image reading unit) with a space therebetween, and the image forming apparatus has an opening that is located at a front side thereof and in communication with the space.

According to the above embodiment, the sheet post-processing device 2 provided in the space 1*a* of the image forming apparatus 1 has a stapling function. However, post-processing performed by the sheet post-processing device 2 is not necessarily stapling processing, and may be punch processing of punching a hole in a stack of sheets on the post-processing tray 11.

Furthermore, the shape, number, etc., of each of the aforementioned members, such as the CD reference plate 12 and the FD alignment member 14, are not limited to those described above, and may be determined appropriately according to the structure of the apparatus.

(8) For example, when the image forming apparatus 1 is powered on, or when the image forming apparatus 1 resumes an operation after jam processing, the controller 104 performs initialization so that the protrusion 12*a* of the CD reference plate 12 makes contact with the CD reference plate 29 from the back side of the apparatus. In other words, the controller 104 causes the CD reference plate 12 and the swing tray 22 to move so that, with the swing tray 22 being lowered to the inclined state, the CD reference plate 12 is at the home position and the protrusion 12*a* is at a back surface of the CD reference plate 29 closer to the back side of the apparatus.

Figure 15:
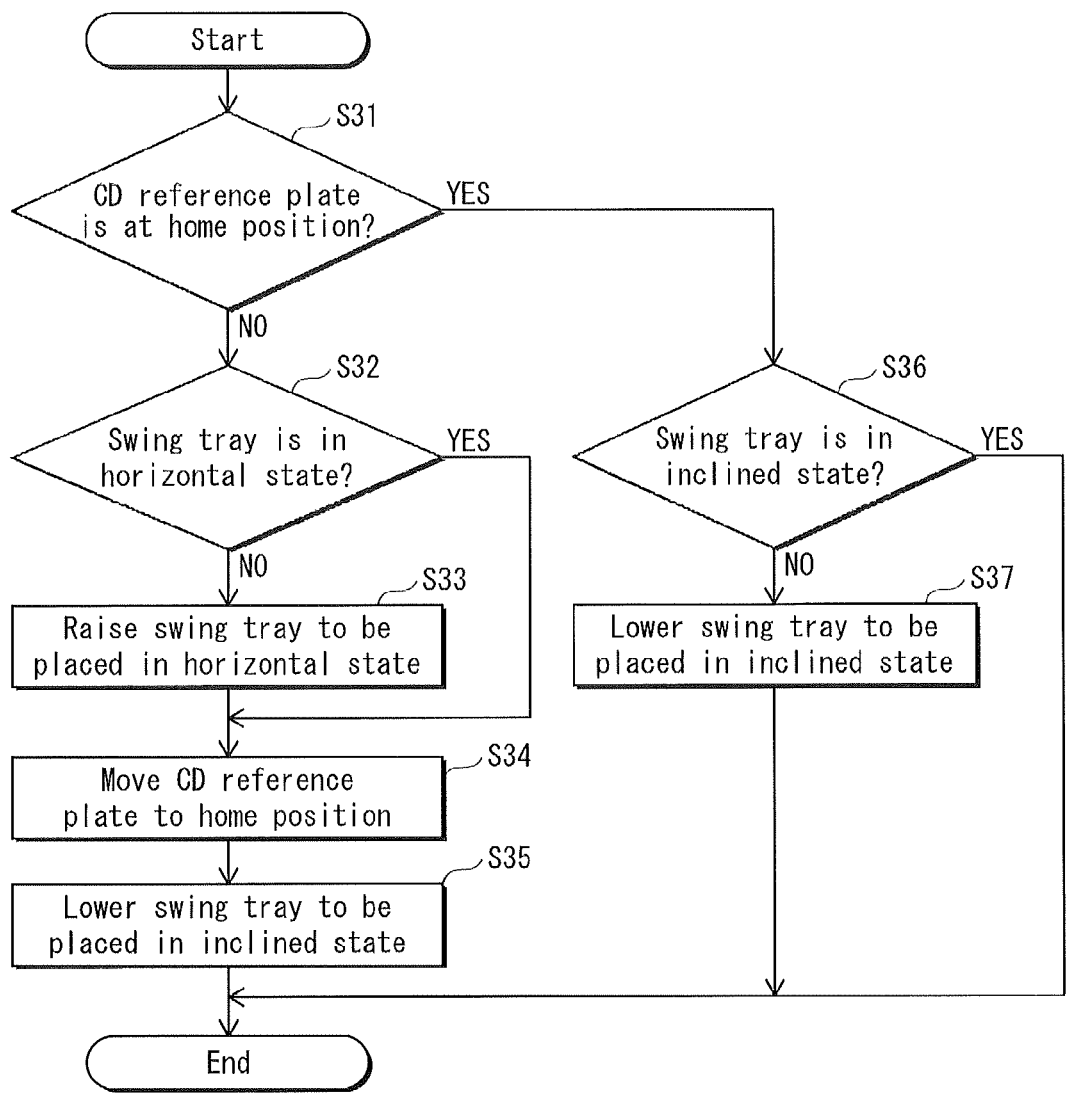
FIG. 15 shows details of initialization processing.

FIG. 15 shows details of initialization processing.

As shown in FIG. 15, when the CD reference plate 12 is not at the home position ("NO" in step S31), the controller 104 proceeds to step S32. When the swing tray 22 is not in the horizontal state ("NO" in step S32), the controller 104 causes the swing tray 22 to rise and transition to the horizontal state (step S33). When the swing tray 22 is in the horizontal state ("YES" in step S32), the controller 104 skips step S33 so that the swing tray 22 remains in the horizontal state and proceeds to the next step. Next, the controller 104 causes the CD reference plate 12 to move to the home position (step S34), causes the swing tray 22 to descend to the inclined state (step S35), and ends the processing.

On the other hand, when the CD reference plate 12 is at the home position ("YES" in step S31) and the swing tray 22 is not in the inclined state ("NO" in step S36), the controller 104 causes the swing tray 22 to descend and transition to the inclined state (step S37). When the swing tray 22 is in the inclined state ("YES" in step S36), the controller 104 skips step S37 so that the swing tray 22 remains in the inclined state and ends the processing.

With the above processing, the swing tray 22 is lowered to the inclined state, the CD reference plate 12 is set at the home position and the protrusion 12*a* is set at the back surface of the CD reference plate 29 closer to the back side of the apparatus.

(9) In the image forming apparatus 1 described above, the front tray 51 is aligned with the operation unit 5 in the lateral direction of the apparatus (see FIG. 1) when the front tray 51 is seen from the front the side of the apparatus. Also, the edge 51*d* of the front tray 51 at the front side of the apparatus is located closer to the front side of the apparatus in the front-back direction of the apparatus than the edge 3*a* (see FIG. 1) of the scanning unit 3 at the front side of the apparatus, and does not protrude farther than a front surface of the apparatus. Also, as shown in FIG. 3, the length of the front tray 51 in the lateral direction of the apparatus is substantially the same as the length of the swing tray 22 of the first housing 101 in the lateral direction of the apparatus. With such a structure, the size of the image forming apparatus 1 in the left-right direction and the height thereof can be reduced, and the user can easily take ejected sheets.

Also, the length of the front tray 51 in the front-back direction of the apparatus is shorter than the length of a short side (210 mm) of an A4-size sheet. In this way, when a sheet having a frequently-used size is ejected, the sheet protrudes more frontward than the image forming apparatus (see FIGS. 2 and 11), and the user can easily take the sheet.

The upstanding wall 51*b* is provided with a recess 51*e* (see FIG. 1) in addition to the cuts 51*c*. The recess 51*e* is a cut wider than each of the cuts 51*c* in the lateral direction of the apparatus. The recess 51*e* is provided so as to allow the user to put his/her hand into the space 1*a*. This facilitates jam processing within the space 1*a*.

(10) The front tray 51 is not limited to having the above-described shape. FIGS. 16A to 16D are each a top view schematically showing a front tray 151 according to a modification. The front tray 151 is provided at the same position as the front tray 51 of the sheet post-processing device 2 mounted in the image forming apparatus 1 in FIG. 1.

Figure 16A:
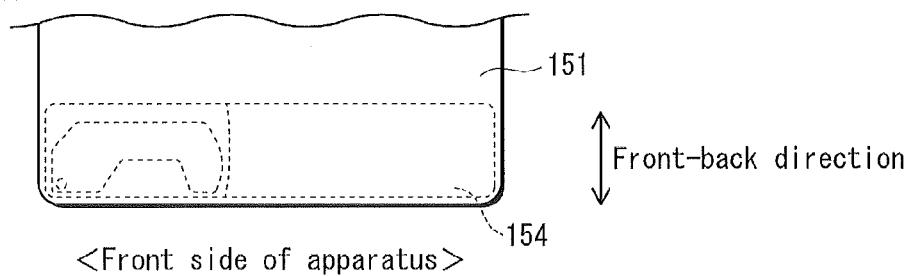
FIGS. 16A to 16D are each a top view schematically showing a front tray according to a modification.
Figure 16B:
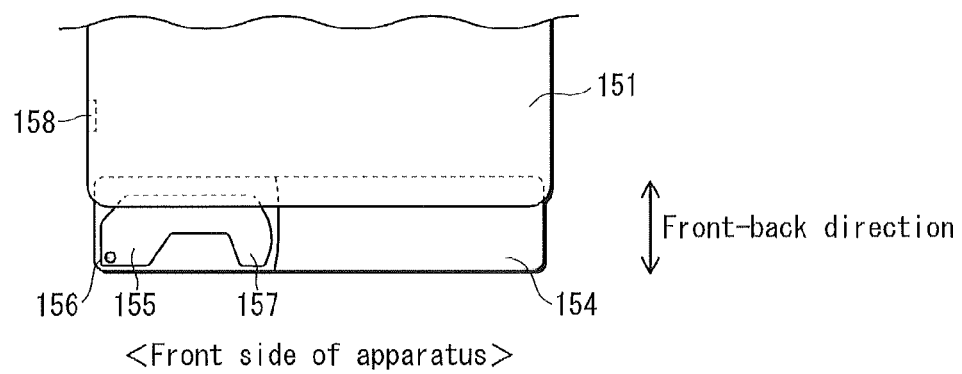
Figure 16C:
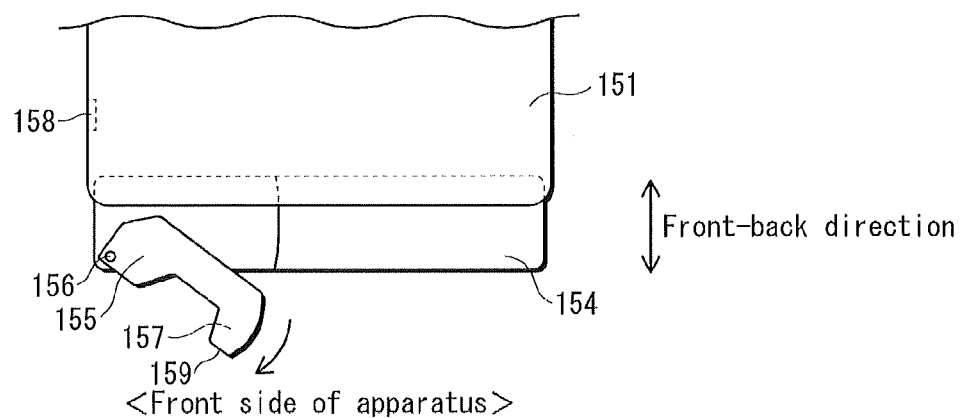
Figure 16D:
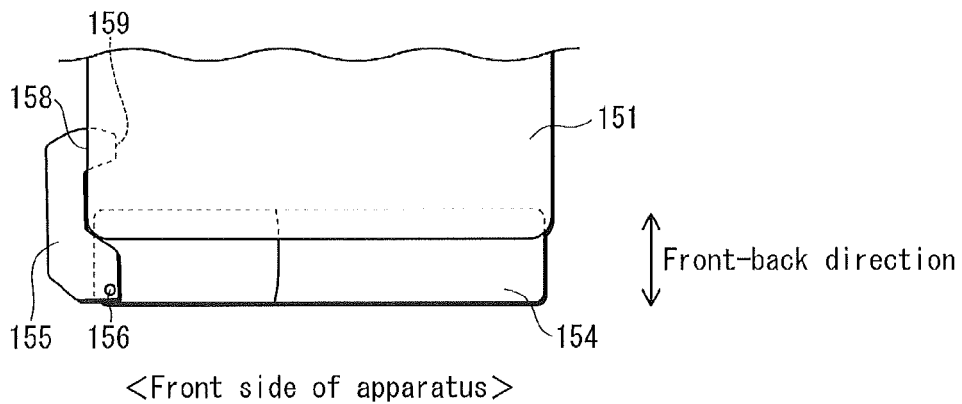

As shown in FIG. 16A, the front tray 151 houses a first extension tray 154 (dashed line). As shown in FIG. 16B, the first extension tray 154 can be pulled out toward the front side of the apparatus. The first extension tray 154 may be provided with a second extension tray 155. The second extension tray 155 is rotatable about a rotational center 156 at an end of the first extension tray 154 closer to the left side of the apparatus.

The second extension tray 155 rotates about the rotational center 156, so that the second extension tray 155 can change from a first state (see FIG. 16B) in which the second extension tray 155 completely overlaps with the first extension tray 154, through a state (see FIG. 16C) in which an end 157 at the right side opposite to the rotational center 156 in the left-right direction is pulled out, to a second state (see FIG. 16D) in which the second extension tray 155 is adjacent to an end of the front tray 151 at the left side of the apparatus. Also, with the rotation of the second extension tray 155 about the rotational center 156, the second extension tray 155 can return from the second state to the first state. In the second state, a tip 159 of the end 157 of the second extension tray 155 enters a hole 158 provided in a side surface of the front tray 151 at the left side of the apparatus, so that the second extension tray 155 engages with the front tray 151.

A sheet placement surface for placing a stack of sheets is extended toward the front side of the apparatus by pulling out the first extension tray 154, and is further extended toward the left side of the apparatus by the second extension tray 155. This prevents the fall or displacement of a large-size sheet or a curled sheet.

Figure 17A:
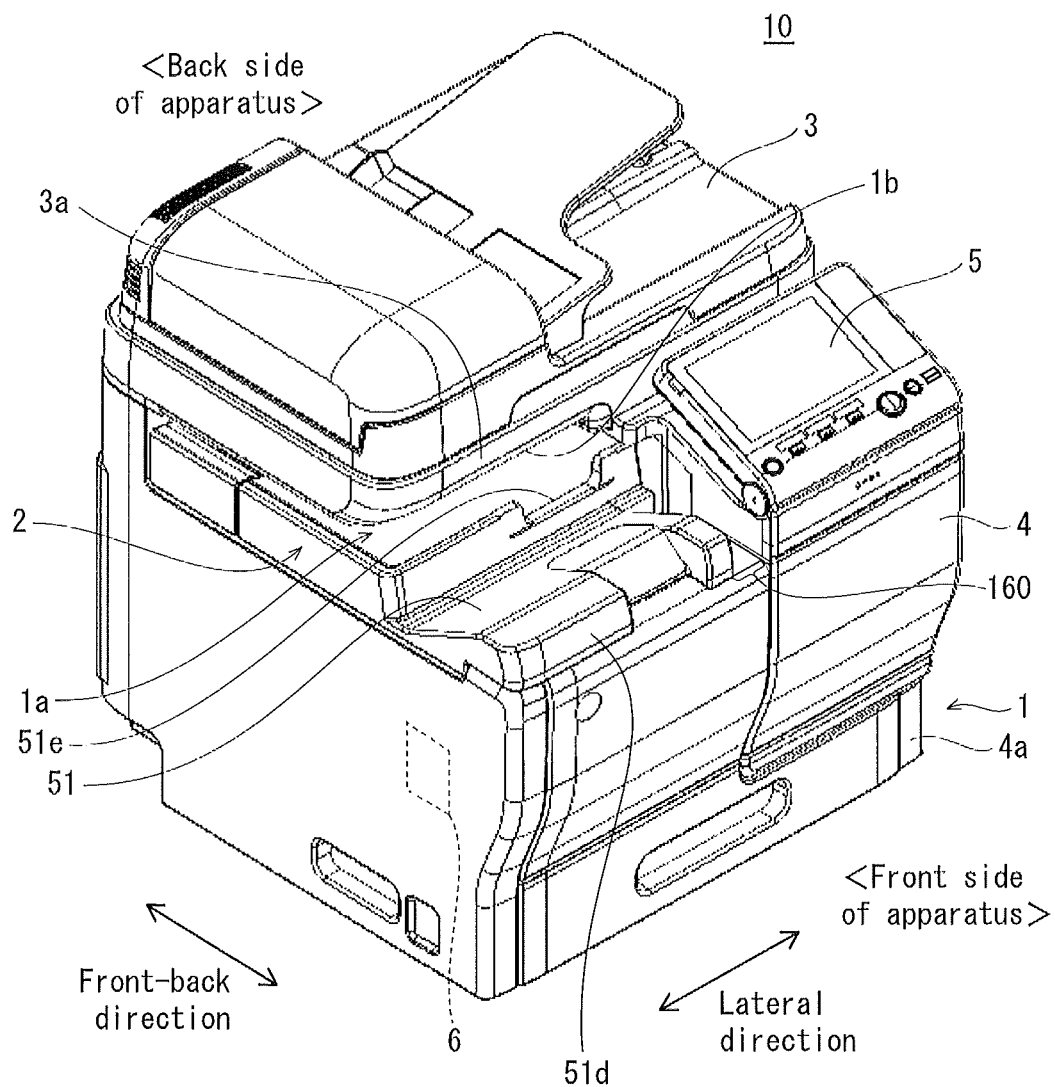
FIG. 17A is an overall perspective view showing the structure according to a modification where a gap is provided at the right side of the front tray.
Figure 17B:
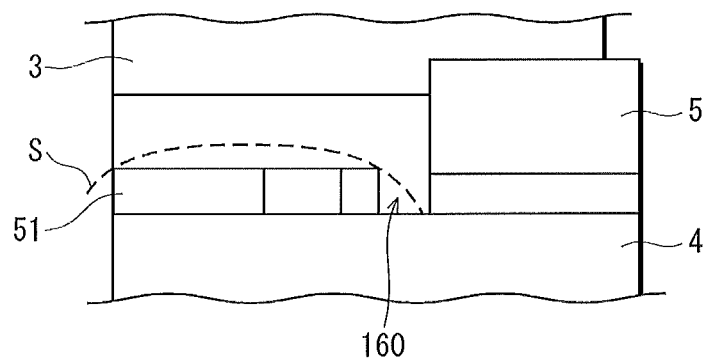
FIG. 17B is a schematic front view showing the periphery of the front tray in the structure according to the modification.

(11) As shown in FIG. 17A which is an overall perspective view and FIG. 17B which is a schematic front view showing the periphery of a front tray, a gap 160 having a length of approximately 20 mm in the lateral direction may be provided at an end of the front tray 51 closer to the right side of the apparatus. The gap 160 is provided because of the following reason. Suppose that an ejected sheet S is largely curled due to having a large thickness (shown by a dashed line in FIG. 17B). In this case, the sheet S is susceptible to slipping and falling from the front tray 51. However, with the gap 160, an end of the sheet S slides into the gap 160, and this prevents the fall of the sheet S.

Figure 18:
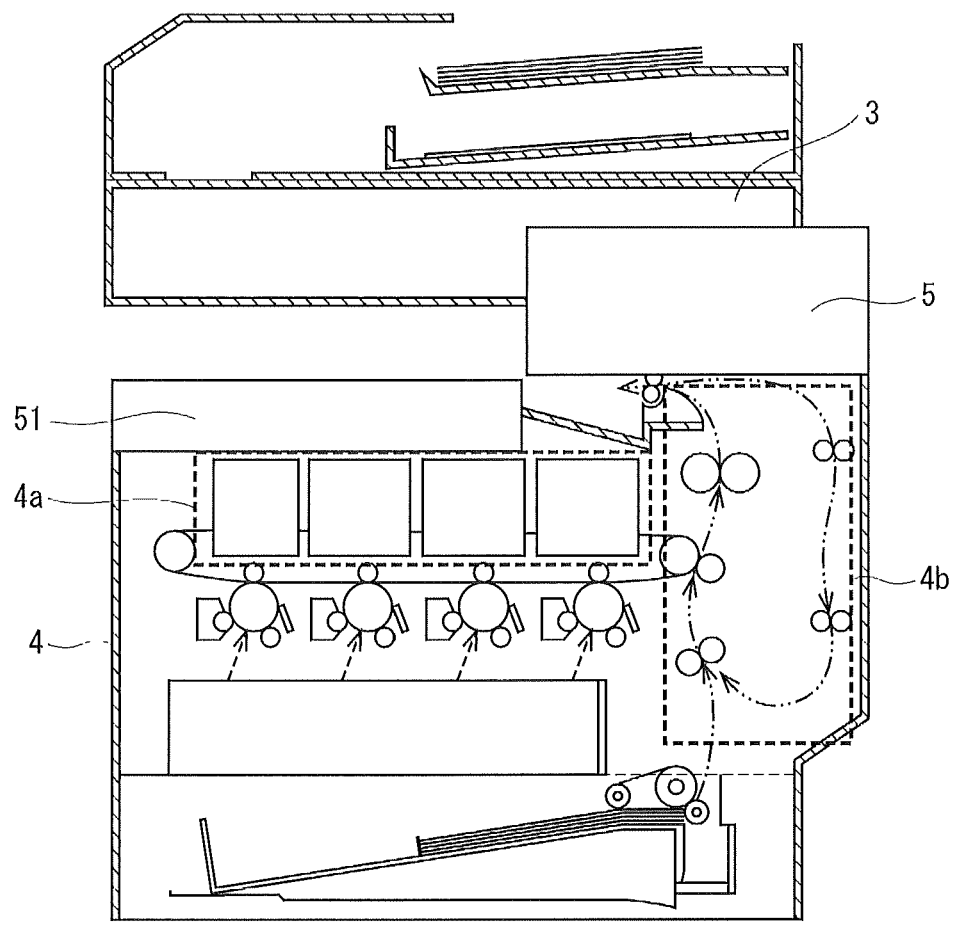
FIG. 18 schematically shows an overall structure of an image forming apparatus according to a modification.

(12) In the case where the image forming apparatus 1 performs image formation by an electrophotographic method, a toner box 4*a* may be provided inside the image forming apparatus 1 at the position below the front tray 51, as shown in FIG. 18. The toner box 4*a* is located closer to the front side of the image forming apparatus 1 than the post-processing tray 11 in the front-back direction of the image forming apparatus 1. In this way, the toner box 4*a* does not interfere with the swing tray 22. This makes it possible to reduce the size of the image forming apparatus 1 in both the height direction and the left-right direction.

Also, the image forming apparatus 1 may be provided with a sheet transport unit 4*b* for forming an image on a sheet and ejecting the sheet to the space 1*a*. Specifically, the sheet transport unit 4*b* may be arranged at the right side of the apparatus when the apparatus is seen from the front side, i.e., at the same side at which the operation unit 5 is arranged. Furthermore, the front tray 51 may be arranged on the left side of the apparatus when the apparatus is seen from the front side. This structure makes it possible to reduce the size of the image forming apparatus 1.

(13) In the image forming apparatus 1 according to the above embodiment, the operation unit 5 is arranged on the right and the front tray 51 is arranged on the left when the image forming apparatus 1 is seen from the front side. However, the operation unit 5 and the front tray 51 may be switched around so that the operation unit 5 is arranged on the left and the front tray 51 is arranged on the right.

(14) The present invention according to the above embodiment also includes the following aspects.

(a) A post-processing device includes an alignment tray (post-processing tray 11), a first alignment plate (CD reference plate 12) for aligning sheets supplied and stacked on the alignment tray, a second alignment plate (CD reference plate 29) integrally movable with the first alignment plate, and a controller for controlling movement of the alignment tray, the first alignment plate, and the second alignment plate. The alignment tray includes a first alignment tray (swing tray 22) and a second alignment tray (fixed tray 21). The controller causes at least one of the first alignment tray and the second alignment tray to move so that the first alignment tray is connected to or separate from the second alignment tray. In a state where the first alignment tray is connected to the second alignment tray, the first alignment plate engages with the second alignment plate so that the first alignment plate integrally moves with the second alignment plate. In a state where the first alignment tray is separated from the second alignment tray and the relative positions of the first alignment tray and the second alignment tray are changed, the first alignment plate disengages from the second alignment plate so that only the first alignment plate moves.

(b) In the post-processing device, the first alignment plate performs alignment of sheets and pushing of the sheets from the alignment tray to an ejection tray (front tray 51). For the alignment of sheets on the alignment tray, the first alignment plate and the second alignment plate integrally move in an engagement state where the first alignment plate is engaged with the second alignment plate. For the pushing of sheets from the alignment tray to the ejection tray, the first alignment plate disengages from the second alignment plate so that only the first alignment plate moves.

(c) The post-processing device further includes a motor (CD alignment motor M3) for driving the first alignment plate, and a bias member (tension spring 28) for applying a biasing force to the second alignment plate in a reverse direction relative to a sheet alignment direction by the second alignment plate. The first alignment plate is provided with an interlock bar (protrusion 12*a*) for engaging with the second alignment plate.

The controller aligns sheets with the first alignment plate being engaged with the second alignment plate. When the first alignment plate is driven in a sheet alignment direction by the motor, the interlock bar of the first alignment plate pushes the second alignment plate in the sheet alignment direction, whereby the first alignment plate and the second alignment plate both move in the sheet alignment direction. When the first alignment plate is driven in the reverse direction relative to the sheet alignment direction, the second alignment plate moves in the reverse direction relative to the sheet alignment direction by the bias force by the bias member applied to the second alignment plate, whereby the first alignment plate and the second alignment plate both move in the reverse direction relative to the sheet alignment direction.

(d) For pushing of sheets to the ejection tray, the controller performs control so that the interlock bar of the first alignment plate disengages from the second alignment plate, and only the first alignment plate is moved by the drive of the motor.

(e) The controller causes the first alignment tray to move up and down relative to the second alignment tray. For the alignment of sheets, the controller causes the first alignment tray to descend relative to the second alignment tray so that the first alignment tray is connected to the second alignment tray. For the pushing of sheets to the ejection tray, the controller causes the first alignment tray to rise relative to the second alignment tray so that the first alignment tray is separated from the second alignment tray.

(f) The ejection tray is arranged in a direction perpendicular to a direction in which sheets are supplied to the alignment tray, and the first alignment plate ejects the sheets to the ejection tray.

(g) For each of the first alignment plate and the second alignment plate, a home position is set at a maximum movement position in the reverse direction relative to the sheet alignment direction. The home position of the first alignment plate is positioned farther than the home position of the second alignment plate in the reverse direction relative to the sheet alignment direction (i.e., the home position of the first alignment plate is positioned farther from the ejection tray than the home position of the second alignment plate). When the first alignment plate and the second alignment plate are both at the respective home positions, the interlock bar is positioned farther than the second alignment plate in the reverse direction relative to the sheet alignment direction.

(h) After pushing sheets to the ejection tray in a state where the first alignment tray is raised, the controller returns the first alignment plate to the home position and causes the first alignment tray to descend.

(i) When the post-processing device is powered on, or when the post-processing device suspends an operation and thereafter resumes the operation, if the first alignment tray is not lowered, the controller returns the first alignment plate to the home position and thereafter causes the first alignment tray to descend.

(15) The present invention may be any combination of the embodiment and modifications described above.

SUMMARY

The above-described embodiment and modifications show aspects of the present invention for solving the problem described in the RELATED ART section. The embodiment and the modifications can be summarized as follows.

A first aspect of the present invention is a sheet post-processing device mounted in an image forming apparatus that includes an image reading unit and an image forming unit, the image forming unit being located under the image reading unit with a space therebetween, the image forming apparatus having an opening that is located at a front side thereof and in communication with the space, the sheet post-processing device comprising: a first tray that is located in the space and houses a sheet ejected from the image forming unit; a post-processing unit that is located in the space and performs post-processing on a sheet in the first tray; a transfer member that, after the post-processing is performed on a sheet in the first tray, transfers the sheet to the front side of the image forming apparatus; and a second tray that is located closer to the front side of the image forming apparatus than the first tray and houses a sheet transferred by the transfer member.

The second tray may have: a sheet placement surface that is inclined downward from the front side of the image forming apparatus to a back side thereof, and on which a sheet transferred by the transfer member is placed; and a regulation member that, when a sheet on the sheet placement surface slips down along the inclination of the sheet placement surface, makes contact with a leading edge of the sheet in a slip direction and thereby regulates the slip of the sheet.

The sheet post-processing device may further comprise: a tray moving unit that moves at least one of the first tray and the second tray in an up-and-down direction and changes positions of the first tray and the second tray relative to each other; and a control unit that controls the tray moving unit such that when a sheet ejected from the image forming unit is transported to the first tray, at least a part of a given side edge of a sheet placement surface of the first tray is positioned lower than an upper edge of the regulation member of the second tray, the given side edge being at the front side of the image forming apparatus, and when the sheet is housed in the first tray, an entirety of the given side edge of the sheet placement surface of the first tray is positioned higher than or at the same level as the upper edge of the regulation member of the second tray.

The sheet placement surface of the first tray may be a surface on which a sheet is placed when the sheet is ejected from the image forming unit in a left-right direction of the image forming apparatus perpendicular to a front-back direction thereof, and the first tray may be a swing tray supported in a manner that one end of the swing tray located in a sheet eject direction in which a sheet is ejected is swingable up and down about a shaft provided at another end of the swing tray in the sheet eject direction, the given side edge of the sheet placement surface of the first tray, which is at the front side of the image forming apparatus, may include a first side edge portion and a second side edge portion, the first side edge portion being a portion of the given side edge closer to the other end of the swing tray, the second edge portion being a portion of the given side edge closer to the one end of the swing tray, the first side edge portion being positioned higher than or at the same level as the upper edge of the regulation member of the second tray, and the control unit may perform control such that when a sheet is ejected from the image forming unit and transported to the swing tray, the swing tray is placed in an inclined state in which the second side edge portion of the sheet placement surface of the swing tray is positioned lower than the upper edge of the regulation member of the second tray, and when the sheet is housed in the swing tray, the swing tray is placed in a transfer state in which the second side edge portion of the sheet placement surface of the swing tray is positioned higher than or at the same level as the upper edge of the regulation member of the second tray.

The sheet post-processing device may further comprise: a pair of alignment members that aligns a sheet on the swing tray in the inclined state, the alignment being performed in the front-back direction of the image forming apparatus, wherein the pair of alignment members may be composed of a first alignment member and a second alignment member that are aligned in the front-back direction of the image forming apparatus and sandwich the sheet on the swing tray in the inclined state, the first alignment member being positioned at the front side of the image forming apparatus, and the second alignment member being positioned at the back side of the image forming apparatus, the first alignment member may move independently from the swing tray, and when the swing tray is placed in the transfer state, an upper edge of the first alignment member may be positioned lower than the swing tray in the transfer state, and the second alignment member may be integrally swingable with the swing tray, be movable on the swing tray in the front-back direction of the image forming apparatus, and also serve as the transfer member.

The post-processing unit may be a stapler that staples a stack of sheets composed of a plurality of sheets, after the stack of sheets is placed on the swing tray and aligned by the pair of alignment members.

The sheet post-processing device may further comprise: a transport member that transports a sheet on the swing tray from the one end to the other end, wherein the one end of the swing tray may be located upstream in the sheet eject direction, the other end of the swing tray may be located downstream in the sheet eject direction, the stapler may be arranged at a predetermined position that is at the back side of the image forming apparatus and located downstream in a sheet transport direction by the transport member, and after a stack of sheets is placed on the swing tray in the inclined state and aligned by the pair of alignment members, the control unit may cause the transport member to transport the stack of sheets to a stapling position at which the stapler performs stapling.

The sheet post-processing device may further comprise: a fixed tray that is provided separately from the swing tray and does not move integrally with the swing tray, wherein the fixed tray may be arranged more upstream than the swing tray in the sheet eject direction, the transport member may be capable of transporting a sheet on the fixed tray in the same direction as the sheet transport direction of a sheet on the swing tray, and before causing the swing tray to transition from the inclined state to the transfer state, the control unit may cause the transport member to transport a stack of sheets that is either on the fixed tray or over both the fixed tray and the swing tray in the inclined state to a predetermined transfer position, the predetermined transfer position being a position at which the stack of sheets is placed on the swing tray in the inclined state and not placed on the fixed tray.

The stapler may swing integrally with the swing tray.

With the sheet post-processing device being mounted in the image forming apparatus, an edge of the second tray at the front side of the image forming apparatus may be located closer to the front side of the image forming apparatus in the front-back direction of the image forming apparatus than an edge of the image reading unit at the front side of the image forming apparatus.

A second aspect of the present invention is an image forming system including a sheet post-processing device and an image forming apparatus, the image forming apparatus comprising an image reading unit and an image forming unit, the image forming unit being located under the image reading unit with a space therebetween, the image forming apparatus having an opening that is located at a front side thereof and in communication with the space, the sheet post-processing device comprising: a first tray that is located in the space and houses a sheet ejected from the image forming unit; a post-processing unit that is located in the space and performs post-processing on a sheet in the first tray; a transfer member that, after the post-processing is performed on a sheet in the first tray, transfers the sheet to the front side of the image forming apparatus; and a second tray that is located closer to the front side of the image forming apparatus than the first tray and houses a sheet transferred by the transfer member, the image forming apparatus further comprising: an operation unit that is provided at the front side of the image forming apparatus and receives an input through a user operation, wherein the operation unit is aligned with the second tray of the sheet post-processing device in a left-right direction of the image forming apparatus.

The second tray may not protrude farther than a front surface of the image forming apparatus.

A width of the second tray in a front-back direction may be smaller than a width of at least one usable sheet size.

The second tray may have: a sheet placement surface that is inclined downward from the front side of the image forming apparatus to a back side thereof, and on which a sheet transferred by the transfer member is placed; and a regulation member that, when a sheet on the sheet placement surface slips down along the inclination of the sheet placement surface, makes contact with a leading edge of the sheet in a slip direction and thereby regulates the slip of the sheet, and at least a portion of the regulation member may have a cut.

The image forming apparatus may have a toner box and perform image formation by an electrophotographic method, and the second tray may be arranged above the toner box.

The image forming apparatus may further comprise a transport unit that transports a sheet on which an image is formed, and the transport unit may be arranged at the same side at which the operation unit is arranged, in a left-right direction of the image forming apparatus.

According to the structure described above, the second tray is arranged closer to the front side of the image forming apparatus than the first tray. Also, a sheet in the first tray is subjected to post-processing and then transferred to the front side of the image forming apparatus to be housed in the second tray. This structure makes it possible to reduce the size of the sheet post-processing device in the left-right direction, as compared to a conventional structure where two trays are aligned in the left-right direction. This, as a result, makes it possible to reduce the length of the space between the image reading unit and the image forming unit of the image forming apparatus, and also to reduce the space occupied by the image forming apparatus as a whole in the left-right direction.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A sheet post-processing device mounted in an image forming apparatus that includes an image reading unit and an image forming unit, the image forming unit being located under the image reading unit with a space therebetween, the image forming apparatus having an opening that is located at a front side thereof and in communication with the space, the sheet post-processing device comprising:
   a first tray that is located in the space and receives a sheet ejected from the image forming unit;
   a post-processing unit that is located in the space and performs post-processing to a sheet on the first tray;
   a transfer member that, after the post-processing is performed to the sheet on the first tray, transfers the sheet toward the front side of the image forming apparatus in a direction perpendicular to a sheet ejection direction in which a sheet is ejected to the first tray from the image forming unit;
   a second tray that is located on the front side of the image forming apparatus and receives the sheet transferred from the first tray through the opening by the transfer member;
   wherein the second tray has a sheet placement surface that is inclined downward from the front side of the image forming apparatus to a back side thereof, and on which a sheet transferred by the transfer member is placed, and a regulation member that, when a sheet on the sheet placement surface slips down along the inclination of the sheet placement surface, makes contact with a leading edge of the sheet in a slip direction and thereby regulates the slip of the sheet;
   a tray moving unit that moves at least one of the first tray and the second tray in an up-and-down direction and changes positions of the first tray and the second tray relative to each other; and
   a control unit that controls the tray moving unit such that
   when a sheet ejected from the image forming unit is transported to the first tray, at least a part of a given side edge of a sheet placement surface of the first tray is positioned lower than an upper edge of the regulation member of the second tray, the given side edge being at the front side of the image forming apparatus, and
   when the sheet is received in the first tray, an entirety of the given side edge of the sheet placement surface of the first tray is positioned higher than or at the same level as the upper edge of the regulation member of the second tray.

2. The sheet post-processing device of claim 1,
   wherein the sheet placement surface of the first tray is a surface on which a sheet is placed when the sheet is ejected from the image forming unit in a lateral direction crossing a front-back direction connecting the front side and a back side of the image forming apparatus opposite to the front side, and
   the first tray is a swing tray supported in a manner that one end of the swing tray located in the sheet eject direction is swingable up and down about a shaft provided at another end of the swing tray in the sheet eject direction, the given side edge of the sheet placement surface of the first tray, which is at the front side of the image forming apparatus, includes a first side edge portion and a second side edge portion, the first side edge portion being a portion of the given side edge closer to the other end of the swing tray, the second edge portion being a portion of the given side edge closer to the one end of the swing tray, the first side edge portion being positioned higher than or at the same level as the upper edge of the regulation member of the second tray, and the control unit performs control such that when a sheet is ejected from the image forming unit and transported to the swing tray, the swing tray is placed in an inclined state in which the second side edge portion of the sheet placement surface of the swing tray is positioned lower than the upper edge of the regulation member of the second tray, and when the sheet is housed in the swing tray, the swing tray is placed in a transfer state in which the second side edge portion of the sheet placement surface of the swing tray is positioned higher than or at the same level as the upper edge of the regulation member of the second tray.

3. The sheet post-processing device of claim 2, further comprising:

a pair of alignment members that aligns a sheet on the swing tray in the inclined state, the alignment being performed in the front-back direction of the image forming apparatus, wherein the pair of alignment members is composed of a first alignment member and a second alignment member that are aligned in the front-back direction of the image forming apparatus and sandwich the sheet on the swing tray in the inclined state, the first alignment member being positioned at the front side of the image forming apparatus, and the second alignment member being positioned at the back side of the image forming apparatus, the first alignment member moves independently from the swing tray, and when the swing tray is placed in the transfer state, an upper edge of the first alignment member is positioned lower than the swing tray in the transfer state, and the second alignment member is integrally swingable with the swing tray, is movable on the swing tray in the front-back direction of the image forming apparatus, and also serves as the transfer member.

4. The sheet post-processing device of claim 3, wherein the post-processing unit is a stapler that staples a stack of sheets composed of a plurality of sheets, after the stack of sheets is placed on the swing tray and aligned by the pair of alignment members.

5. The sheet post-processing device of claim 4, further comprising:

a transport member that transports a sheet on the swing tray from the one end to the other end, wherein the one end of the swing tray is located upstream in the sheet eject direction, the other end of the swing tray is located downstream in the sheet eject direction, the stapler is arranged at a predetermined position that is at the back side of the image forming apparatus and located downstream in a sheet transport direction by the transport member, and after a stack of sheets is placed on the swing tray in the inclined state and aligned by the pair of alignment members, the control unit causes the transport member to transport the stack of sheets to a stapling position at which the stapler performs stapling.

6. The sheet post-processing device of claim 5, further comprising:

a fixed tray that is provided separately from the swing tray and does not move integrally with the swing tray, wherein the fixed tray is arranged more upstream than the swing tray in the sheet eject direction, the transport member is capable of transporting a sheet on the fixed tray in the same direction as the sheet transport direction of a sheet on the swing tray, and before causing the swing tray to transition from the inclined state to the transfer state, the control unit causes the transport member to transport a stack of sheets that is either on the fixed tray or over both the fixed tray and the swing tray in the inclined state to a predetermined transfer position, the predetermined transfer position being a position at which the stack of sheets is placed on the swing tray in the inclined state and not placed on the fixed tray.

7. The sheet post-processing device of claim 4, wherein the stapler swings integrally with the swing tray.

8. An image forming system including a sheet post-processing device and an image forming apparatus, the image forming apparatus comprising an image reading unit and an image forming unit, the image forming unit being located under the image reading unit with a space therebetween, the image forming apparatus having an opening that is located at a front side thereof and in communication with the space, the image forming system comprising:

a first tray that is located in the space and receives a sheet ejected from the image forming unit;

a post-processing unit that is located in the space and performs post-processing to the sheet on the first tray;

a transfer member that, after the post-processing is performed to a sheet on the first tray, transfers the sheet toward the front side of the image forming apparatus in a direction perpendicular to a sheet ejection direction in which a sheet is ejected to the first tray from the image forming unit;

a second tray that is located on the front side of the image forming apparatus and receives the sheet transferred from the first tray through the opening by the transfer member;

an operation unit that receives an input through a user operation; and the image forming apparatus has a toner box, and performs image formation by an electrophotographic method, and the second tray is arranged above the toner box.

9. A sheet post-processing device comprising:

an alignment tray that includes a first alignment tray and a second alignment tray;

a first alignment plate that aligns sheets supplied and stacked on the alignment tray;

a second alignment plate that is integrally movable with the first alignment plate; and a controller that controls movement of the alignment tray, the first alignment plate, and the second alignment plate, wherein the controller causes at least one of the first alignment tray and the second alignment tray to move so that the first alignment tray is connected to or separate from the second alignment tray, the first alignment plate engages with the second alignment plate so that the first alignment plate integrally moves with the second alignment plate in a state where the first alignment tray is connected to the second alignment tray, the first alignment plate disengages from the second alignment plate so that only the first alignment plate moves in a state where the first alignment tray is separated from the second alignment tray and the relative positions of the first alignment tray and the second alignment tray are changed.

10. An image forming system including a sheet post-processing device and an image forming apparatus, the image forming apparatus comprising an image reading unit and an image forming unit, the image forming unit being located under the image reading unit with a space therebetween, the image forming apparatus having an opening that is located at a front side thereof and in communication with the space, the image forming system comprising:

a first tray that is located in the space and receives a sheet ejected from the image forming unit;

a post-processing unit that is located in the space and performs post-processing to the sheet on the first tray;

a transfer member that, after the post-processing is performed to a sheet on the first tray, transfers the sheet toward the front side of the image forming apparatus in a direction perpendicular to a sheet ejection direction in which a sheet is ejected to the first tray from the image forming unit;

a second tray that is located on the front side of the image forming apparatus and receives the sheet transferred from the first tray through the opening by the transfer member;

an operation unit that receives an input through a user operation;

wherein the operation unit is provided at the front side of the image forming system, and the second tray is aligned with the operation unit in a lateral direction crossing a front-back direction connecting the front side and a back side of the image forming system opposite to the front side.

11. An image forming system including a sheet post-processing device and an image forming apparatus, the image forming apparatus comprising an image reading unit and an image forming unit, the image forming unit being located under the image reading unit with a space therebetween, the image forming apparatus having an opening that is located at a front side thereof and in communication with the space, the image forming system comprising:

a first tray that is located in the space and receives a sheet ejected from the image forming unit;

a post-processing unit that is located in the space and performs post-processing to the sheet on the first tray;

a transfer member that, after the post-processing is performed to a sheet on the first tray, transfers the sheet toward the front side of the image forming apparatus in a direction perpendicular to a sheet ejection direction in which a sheet is ejected to the first tray from the image forming unit;

an operation unit that receives an input through a user operation;

a second tray that is located on the front side of the image forming apparatus and receives the sheet transferred from the first tray through the opening by the transfer member, wherein the second tray has a sheet placement surface that is inclined downward from the front side of the image forming apparatus to a back side thereof, and on which a sheet transferred by the transfer member is placed, and a regulation member that, when a sheet on the sheet placement surface slips down along the inclination of the sheet placement surface, makes contact with a leading edge of the sheet in a slip direction and thereby regulates the slip of the sheet;

a tray moving unit that moves at least one of the first tray and the second tray in an up-and-down direction and changes positions of the first tray and the second tray relative to each other; and a control unit that controls the tray moving unit such that when a sheet ejected from the image forming unit is transported to the first tray, at least a part of a given side edge of a sheet placement surface of the first tray is positioned lower than an upper edge of the regulation member of the second tray, the given side edge being at the front side of the image forming apparatus, and when the sheet is received in the first tray, an entirety of the given side edge of the sheet placement surface of the first tray is positioned higher than or at the same level as the upper edge of the regulation member of the second tray.

* * * * *